(12) United States Patent
Lubar et al.

(10) Patent No.: US 12,322,566 B2
(45) Date of Patent: Jun. 3, 2025

(54) SYSTEMS AND METHODS FOR A LIQUID METAL BEARING ASSEMBLY FILL PORT AND PLUG

(71) Applicant: GE Precision Healthcare LLC, Waukesha, WI (US)

(72) Inventors: Eric J Lubar, West Milwaukee, WI (US); Andrew T Triscari, West Milwaukee, WI (US); Andrew J Marconnet, West Milwaukee, WI (US); Donald R Allen, West Milwaukee, WI (US); Ryan Randall Dagen, West Milwaukee, WI (US); Ian S Hunt, West Milwaukee, WI (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 87 days.

(21) Appl. No.: 18/342,494

(22) Filed: Jun. 27, 2023

(65) Prior Publication Data

US 2025/0006450 A1 Jan. 2, 2025

(51) Int. Cl.
*H01J 35/10* (2006.01)
*F16C 32/06* (2006.01)

(52) U.S. Cl.
CPC ........ *H01J 35/104* (2019.05); *F16C 32/0633* (2013.01); *F16C 2380/16* (2013.01)

(58) Field of Classification Search
CPC ...... F16C 32/06; F16C 32/0633; F16C 33/12; F16C 33/121; F16C 33/124; F16C 33/125; F16C 33/745; F16C 43/02; F16C 17/107; F16C 2202/50; F16C 2210/08; F16C 2226/12; F16C 2226/30; F16C 2380/16; H01J 35/10; H01J 35/104
See application file for complete search history.

(56) References Cited

U.S. PATENT DOCUMENTS

| | | | |
|---|---|---|---|
| 5,068,885 A | 11/1991 | Vetter | |
| 5,298,293 A | 3/1994 | Ono et al. | |
| 5,583,907 A | 12/1996 | Ono et al. | |
| 6,160,868 A * | 12/2000 | Snyder | H01J 35/107 378/127 |
| 6,546,078 B2 | 4/2003 | Ide | |
| 6,636,583 B2 | 10/2003 | Ratzmann et al. | |
| 6,940,947 B1 | 9/2005 | Humber et al. | |
| 7,746,982 B2 | 6/2010 | Yoshii et al. | |
| 8,300,770 B2 | 10/2012 | Coon et al. | |
| 9,263,224 B2 | 2/2016 | Hunt et al. | |

(Continued)

FOREIGN PATENT DOCUMENTS

| | | |
|---|---|---|
| DE | 19510066 A1 | 5/1996 |
| DE | 19605085 A1 | 8/1997 |

(Continued)

*Primary Examiner* — Jurie Yun
(74) *Attorney, Agent, or Firm* — McCoy Russell LLP

(57) ABSTRACT

Various methods and systems are provided for a liquid metal bearing assembly. In one embodiment, a liquid metal bearing assembly includes a fill port fluidly coupled to a liquid metal reservoir of the liquid metal bearing assembly, the fill port comprising an inlet diameter and an outlet diameter, the outlet diameter smaller than the inlet diameter, and a pin formed to fit inside the fill port and prevent liquid metal from leaving the liquid metal reservoir via the fill port.

20 Claims, 13 Drawing Sheets

(56) References Cited

U.S. PATENT DOCUMENTS

| | | | |
|---|---|---|---|
| 9,972,472 B2 * | 5/2018 | Hunt | F16C 33/109 |
| 11,017,977 B1 | 5/2021 | Hunt et al. | |
| 2007/0009095 A1 | 1/2007 | Turaga et al. | |
| 2017/0169984 A1 | 6/2017 | Tiwari et al. | |
| 2023/0018791 A1 * | 1/2023 | Ide | F16C 33/109 |
| 2024/0347308 A1 * | 10/2024 | Ide | F16C 17/02 |
| 2025/0006449 A1 * | 1/2025 | Triscari | F16C 33/125 |

FOREIGN PATENT DOCUMENTS

| | | |
|---|---|---|
| DE | 19614333 A1 | 10/1997 |
| DE | 102015204488 A1 | 9/2016 |
| EP | 0552808 A1 | 7/1993 |
| JP | H07208454 A | 8/1995 |
| JP | 4704717 B2 | 6/2011 |

* cited by examiner

SYSTEMS AND METHODS FOR A LIQUID METAL BEARING ASSEMBLY FILL PORT AND PLUG

FIELD

Embodiments of the subject matter disclosed herein relate to systems with liquid metal bearing assemblies and methods for assembling the liquid metal bearing assemblies.

BACKGROUND

Liquid metal bearings are used in a variety of operating environments due to their increased longevity and ability to more effectively manage thermal loads, relative to roller bearings. Certain x-ray sources or x-ray tubes, for example, utilize liquid metal bearing assemblies, which may include at least one liquid metal bearing, owing at least in part to their durability and thermodynamic characteristics. However, asymmetric liquid metal distribution and gas formation in the bearing's liquid metal interface can occur in the bearing.

BRIEF DESCRIPTION

In one embodiment, a liquid metal bearing assembly includes a fill port fluidly coupled to a liquid metal reservoir of the liquid metal bearing assembly, the fill port comprising an inlet diameter and an outlet diameter, the outlet diameter smaller than the inlet diameter, and a pin formed to fit inside the fill port and prevent liquid metal from leaving the liquid metal reservoir via the fill port.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
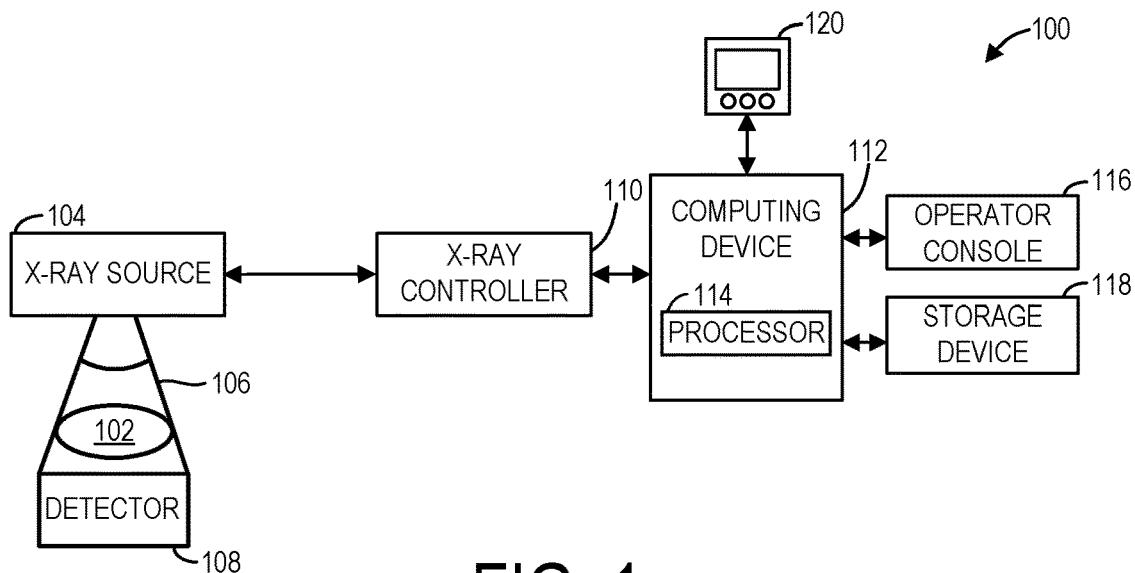
FIG. 1 shows a block schematic diagram of an exemplary x-ray imaging system, according to an embodiment.
Figure 2:
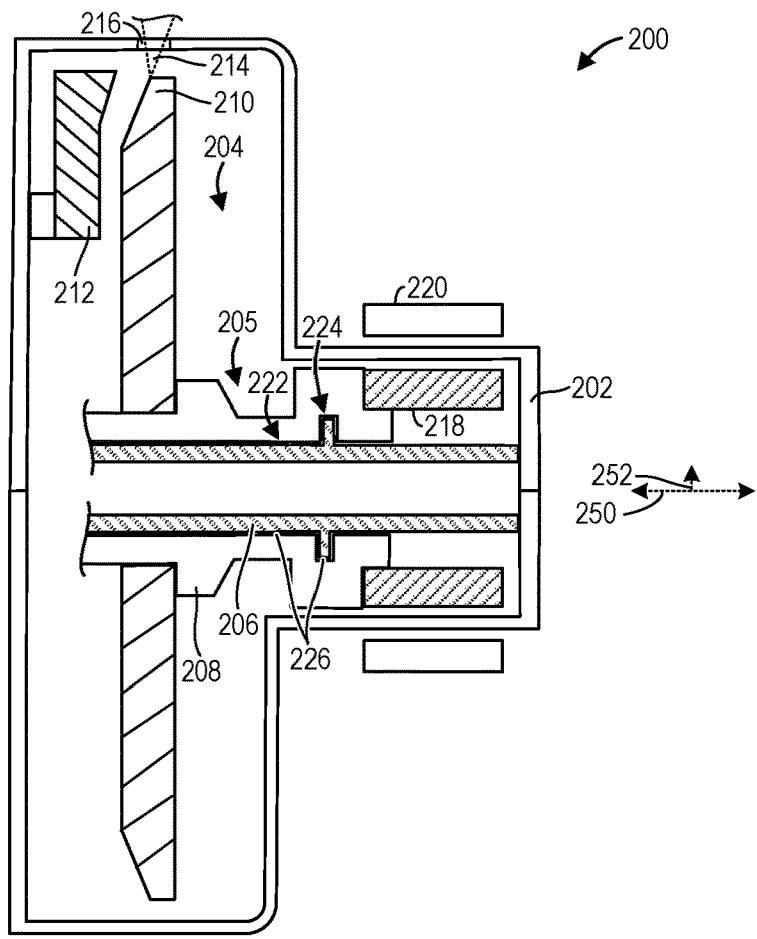
FIG. 2 shows a pictorial view of a portion of an x-ray source, according to an embodiment.
Figure 3:
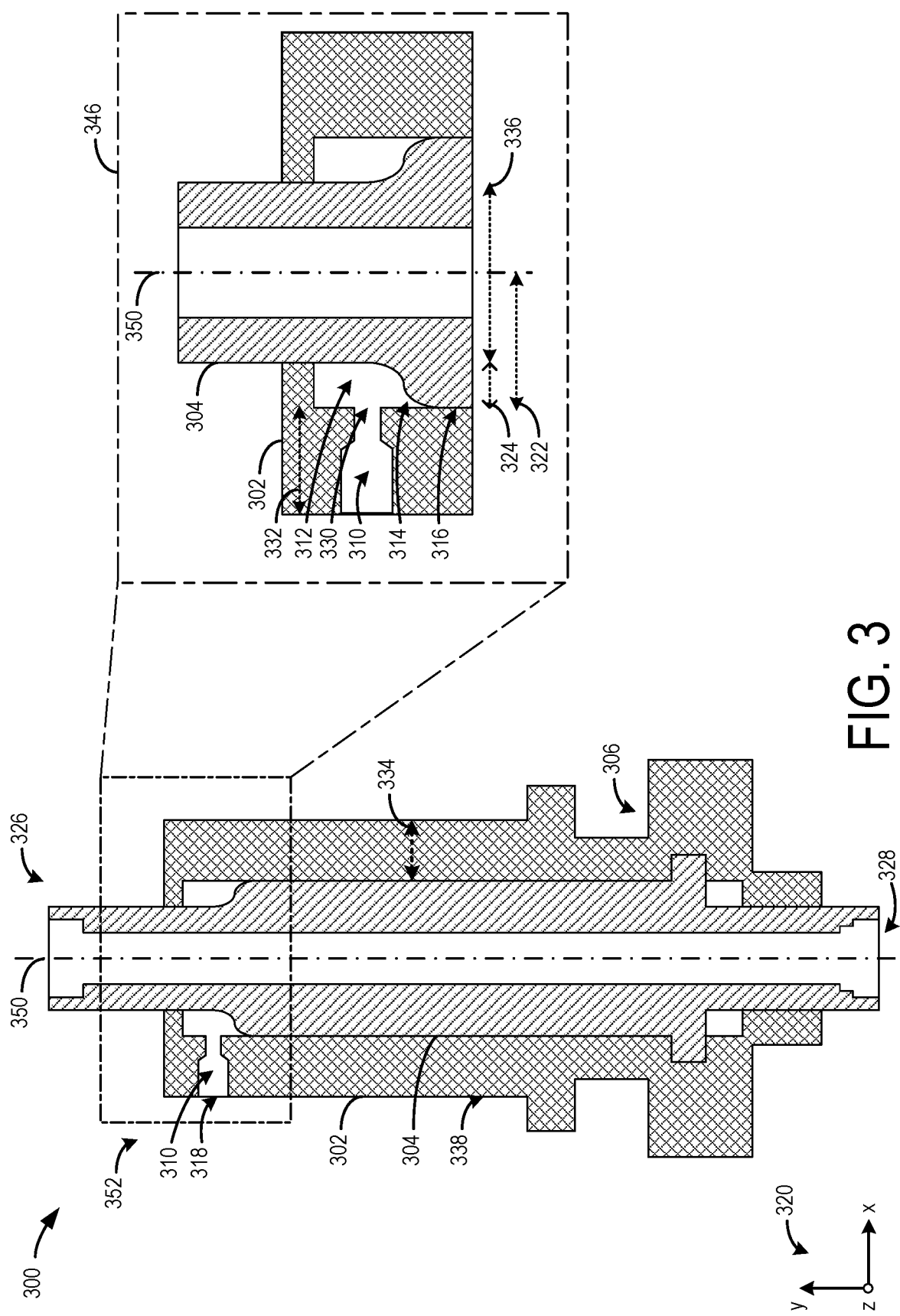
FIG. 3 shows a first exemplary liquid metal bearing assembly, according to an embodiment.
Figure 4:
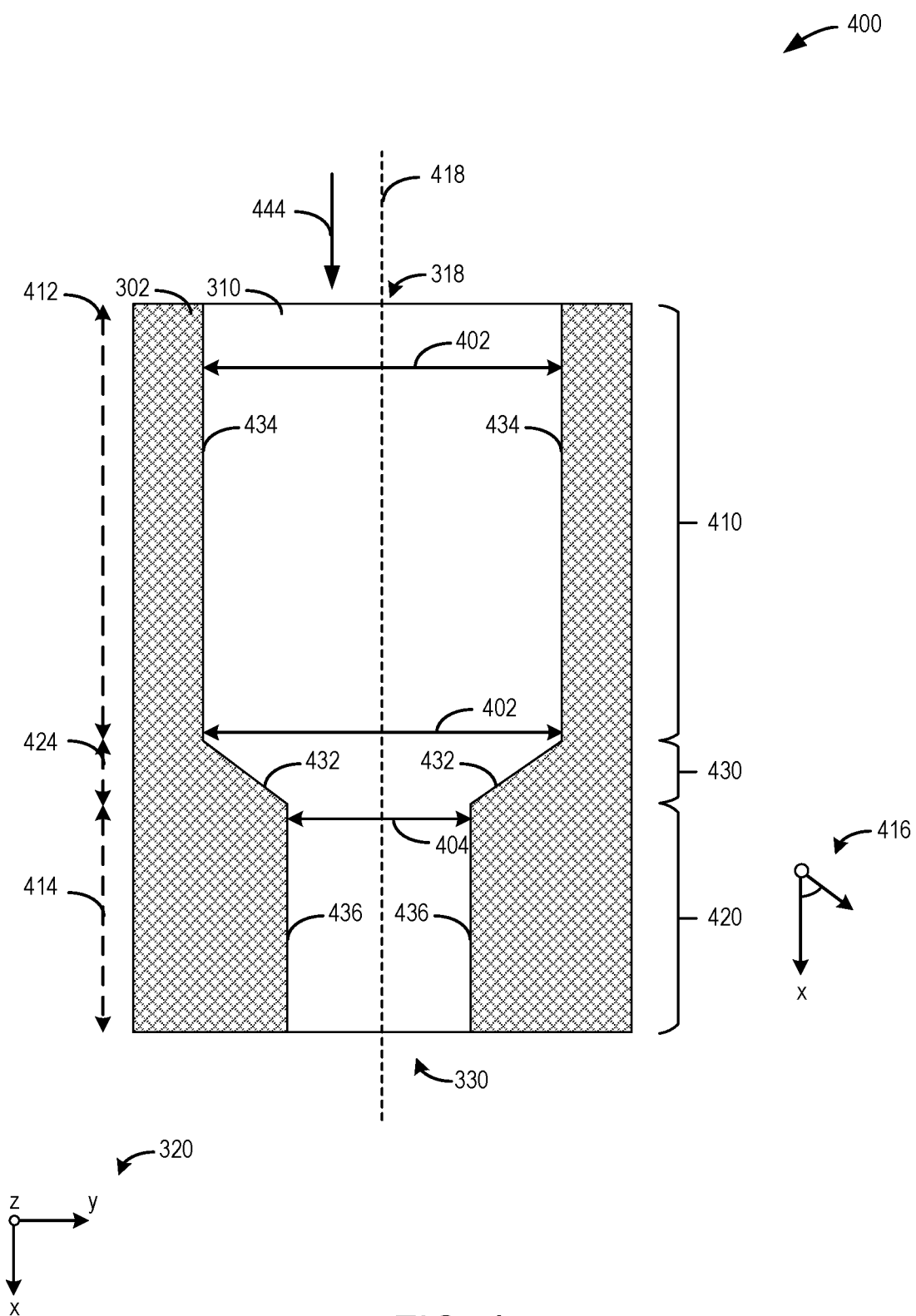
FIG. 4 shows a first embodiment of a fill port of a liquid metal bearing assembly, according to an embodiment.
Figure 5:
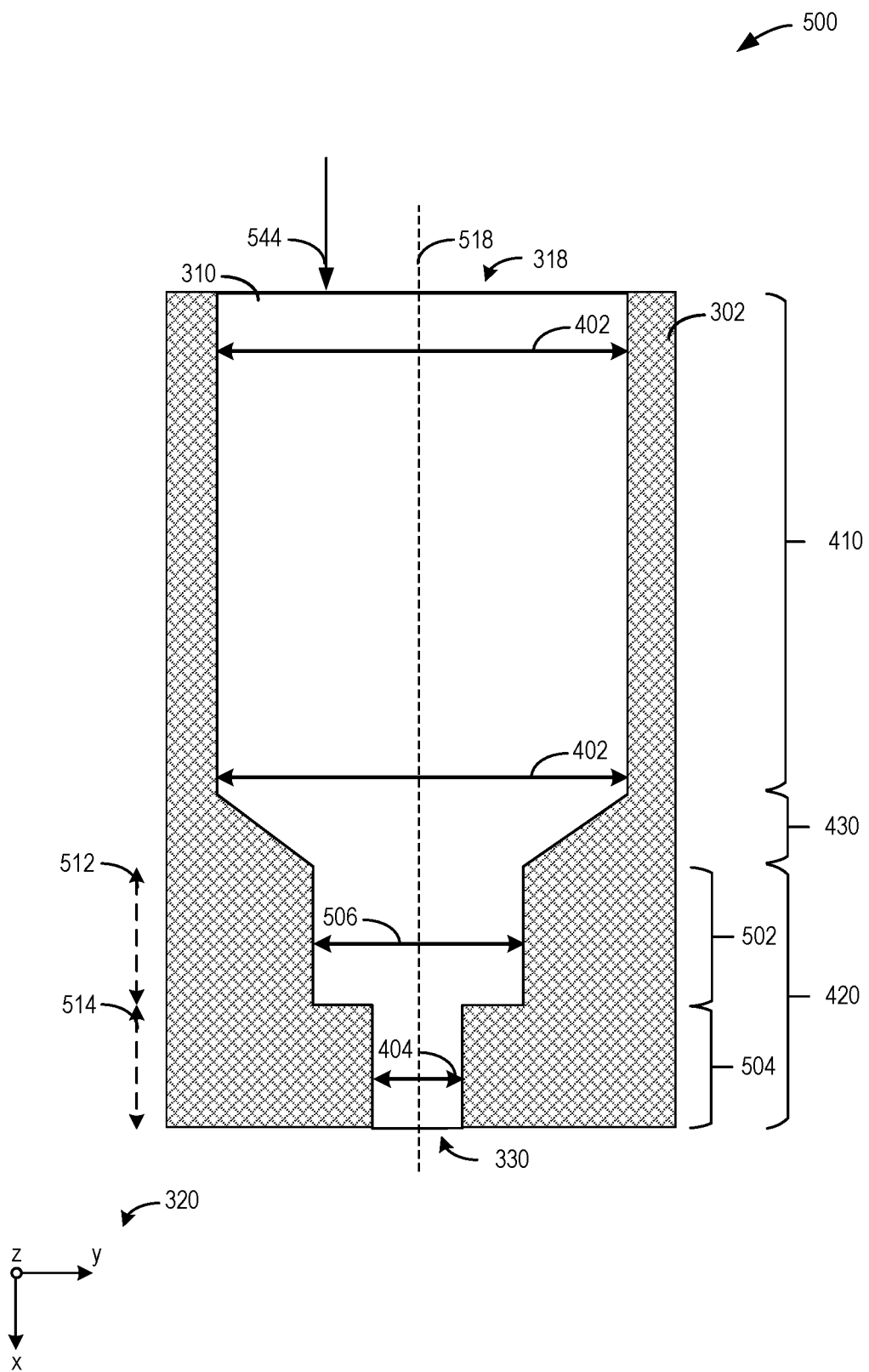
FIG. 5 shows a second embodiment of a fill port of a liquid metal bearing assembly, according to an embodiment.

The following description relates to various embodiments for a liquid metal bearing assembly and more specifically, a fill port of the liquid metal bearing assembly and a pin which may be positioned therein. The liquid metal bearing assembly may be included in an x-ray source of an X-ray imaging system, an example block diagram of which is shown in FIG. 1. An embodiment of an x-ray source is shown in FIG. 2, where the x-ray source is configured with a liquid metal bearing assembly to enable rotation of an anode of the x-ray source. The liquid metal bearing assembly is described herein with respect to an x-ray source of an x-ray imaging system for explanatory purposes, and the liquid metal bearing assembly may be implemented in other systems without departing from the scope of the present disclosure, such as a computed tomography (CT) imaging system. FIG. 3 shows an embodiment of the liquid metal bearing assembly of FIG. 2, where the liquid metal bearing assembly is configured with a rotating sleeve and a stationary shaft. FIG. 4 shows a first embodiment of a fill port disposed in the rotating sleeve of the liquid metal bearing assembly of FIG. 3. FIG. 5 shows a second embodiment of the fill port. Positioning and configuration of the fill port as described herein may enable methods of assembly for the liquid metal bearing assembly which may reduce degradation of seals and other elements of the liquid metal bearing assembly, compared to conventional assembly methods. FIGS. 6A-11 show a plurality of embodiments of a pin which may be inserted into the fill port and a plurality of methods for sealing the pin into the fill port to reduce leakage of liquid metal out of the liquid metal bearing assembly during assembly and operation. FIG. 12 illustrates a method for assembling a liquid metal bearing assembly, which includes inserting and sealing a pin into a fill port following insertion of liquid metal into the liquid metal bearing assembly. FIGS. 2-11 are shown approximately to scale, although other relative dimensions may be used.

Conventional methods for assembling a liquid metal bearing assembly configured as a straddle bearing include exposing seals of the liquid metal bearing assembly and introducing liquid metal, for example, by spilling liquid metal over the seals. Additionally, the liquid metal bearing assembly may be assembled in an orientation where a rotational axis of the liquid metal bearing assembly is parallel with a direction of gravity. When implemented in an x-ray source or x-ray tube, the liquid metal bearing assembly may be positioned horizontally, such that a rotational axis is perpendicular to a direction of gravity. Additionally or alternatively, when implemented in an x-ray source or x-ray tube, the liquid metal bearing assembly may be positioned with the rotational axis positioned at a non-parallel angle, with respect to a direction of gravity. For example, the x-ray source or x-ray tube may be integrated into a moving structure such as a rotating gantry of a CT imaging system.

The aforementioned conventional assembly methods may result in degradation of the seals, incomplete coating of the liquid metal flow path to creating bearing surfaces, leakage of liquid metal from the liquid metal bearing assembly, and a reduced useable life of the liquid metal bearing assembly. Systems and methods are desired for a liquid metal bearing assembly, such as an assembly configured as a straddle bearing, where liquid metal may be introduced to create bearing surfaces without contamination of the seals.

Systems and methods are described herein for a liquid metal bearing assembly with a fill port coupled to a liquid metal reservoir of the liquid metal bearing assembly, where the fill port is positioned in a rotating element of the liquid metal bearing assembly and a radial distance from a bearing centerline. The fill port is comprised of an inlet diameter and an outlet diameter. In some embodiments, the outlet diameter is smaller than the inlet diameter. In some embodiments, the fill port further includes a stepped diameter between the inlet diameter and the outlet diameter, where the stepped diameter may be less than the inlet diameter and greater than the outlet diameter. In further embodiments, the inlet diameter may be equal to the outlet diameter. Further, the liquid metal bearing assembly is comprised of a pin formed to fit inside the fill port and prevent liquid metal from leaving the liquid metal reservoir via the fill port. For example, in embodiments where the outlet diameter is smaller than the inlet diameter, or when the inlet diameter and the outlet diameter are equal, a pin with a constant diameter or a stepped diameter may be positioned in the fill port. In embodiments where the fill port includes the stepped diameter, a pin with a constant diameter or a stepped diameter may be positioned in the fill port. Technical advantages of the herein disclosed system for a liquid metal bearing assembly may include retention of liquid metal during operation of the liquid metal bearing assembly (e.g., during operation of a system in which the liquid metal bearing assembly is implemented), retention of the pin in the fill port, and reducing degradation of seals and other elements of the liquid metal bearing assembly during assembly and operation.

Before further discussion of the liquid metal bearing assembly with a fill port and a pin formed to fit inside the fill port, an example imaging system in which the liquid metal bearing assembly may be implemented is shown. FIG. 1 illustrates an x-ray imaging system 100 designed to generate x-rays. The x-ray imaging system 100 is configured as an x-ray imaging system that may be a computed tomography (CT) imaging system, a radiography imaging system, a fluoroscopy imaging system, a mammography imaging system, an interventional imaging system, a tomography system, etc. in FIG. 1. However, the x-ray imaging system 100 has applicability to fields beyond imaging, medical devices, and the like. For instance, the x-ray imaging system 100 may be deployed in crystallography systems, security scanners, industrial scanners, x-ray photography systems, and so on. In the imaging system example, the system may be configured to image a subject 102 such as a patient, an inanimate object, one or more manufactured parts, and/or foreign objects such as implants, stents, and/or contrast agents present within the body.

The x-ray imaging system 100 may include at least one x-ray source 104, such as an x-ray tube, configured to generate and project a beam of x-ray radiation 106. Specifically, in the illustrated embodiment, the x-ray source 104 is configured to project the x-ray radiation beams 106 towards a detector array 108 and through the subject 102. In some system configurations, the x-ray source 104 may project a cone-shaped x-ray radiation beam which is collimated to lie within an X-Y-Z plane of a Cartesian coordinate system. However, other beam profiles and/or systems omitting the detector array have been envisioned. Each detector element of the array produces a separate electrical signal that is a measurement of the x-ray beam attenuation at the detector location.

Although FIG. 1 depicts only a single x-ray source 104 and detector array 108, in certain embodiments, multiple x-ray sources and/or detectors may be employed to project a plurality of x-ray radiation beams and detect said beams. For instance, in the CT machine use-case example, multiple detectors may be used in tandem with the x-ray sources to acquire projection data at different energy levels corresponding to the subject.

The x-ray imaging system 100 may further include an x-ray controller 110 configured to provide power and timing signals to the x-ray source 104. It will be understood that that system may also include a data acquisition system configured to sample analog data received from the detector elements and convert the analog data to digital signals for subsequent processing.

In certain embodiments, the x-ray imaging system 100 may further include a computing device 112 having a processor 114 and controlling system operations based on operator input. The computing device 112 receives the operator input, for example, including commands and/or scanning parameters via an operator console 116 operatively coupled to the computing device 112. The operator console 116 may include a keyboard, a touchscreen, and/or other suitable input device allowing the operator to specify the commands and/or scanning parameters.

Although FIG. 1 illustrates only one operator console 116, more than one operator console may be included in the x-ray imaging system 100, for example, for inputting or outputting system parameters, requesting examinations, plotting data, and/or viewing images. Further, in certain embodiments, the x-ray imaging system 100 may be coupled to multiple displays, printers, workstations, and/or similar devices located either locally or remotely, for example, and connected via wired and/or wireless networks. In one embodiment, a display 120 may be in electronic communication with the computing device 112 and is configured to display graphical interfaces indicating system parameters, control setting, imaging data, etc.

In one example, the computing device 112 stores the data in a storage device 118. The storage device 118, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 112 provides commands to the x-ray controller 110 and other system components for controlling system operations such as x-ray beam formation, data acquisition and/or processing, etc. Thus, in certain embodiments, the computing device 112 controls system operations based on operator input. To elaborate, the computing device 112 may use the operator-supplied and/or system-defined commands and parameters to operate an x-ray controller 110, which in turn, may control the x-ray source 104. In this way, the intensity and timing of x-ray beam generation may be controlled. It will also be understood that the rotational speed of a sleeve in the x-ray source may be adjusted by the computing device 112 in conjunction with the x-ray controller 110. The sleeve may be a rotating element of a liquid metal bearing assembly, as described herein in greater detail.

Various methods and processes may be stored as executable instructions in non-transitory memory on a computing device (or controller) in x-ray imaging system 100. In one embodiment, the x-ray controller 110 may include the executable instructions in non-transitory memory, and may apply the methods to control the x-ray source 104. In another embodiment, computing device 112 may include the instructions in non-transitory memory, and may relay commands, at least in part, to the x-ray controller 110 which in turn adjusts the x-ray source output.

FIG. 2 shows a detailed embodiment of a portion of an x-ray source, such as an x-ray tube 200. The x-ray tube 200 shown in FIG. 2 serves as an example of the x-ray source 104 depicted in FIG. 1. As such, the x-ray source shown in FIG. 2 as well as the other x-ray source embodiments described herein may include functional and/or structural features from the x-ray source 104, shown in FIG. 1, or vice versa. Furthermore, alternate embodiments combining features from one or more of the systems have also been envisioned. A rotational axis 250 along with a radial axis 252 are provided in FIG. 2 for reference. It will be understood that a radial axis is any axis perpendicular to the rotational axis 250.

The x-ray tube 200 includes a housing 202 having a low-pressure enclosure 204 (e.g., vacuum enclosure) formed therein. It will be understood that a low-pressure enclosure infers a comparatively low-pressure relative to atmospheric pressure. As such, the pressure in the enclosure may be less than atmospheric pressure.

The x-ray tube 200 includes a liquid metal bearing assembly 205 with a rotational component 208 and a stationary component 206. In the illustrated embodiment, the rotational component 208 is a sleeve and the stationary component 206 is a shaft. However, embodiments in which the sleeve is stationary and the shaft rotates have been contemplated. It will be understood that the motion denoted by the descriptors stationary and rotational denote the relative motion between the components. However, in certain use-case examples, the x-ray tube may be integrated into a moving structure. For instance, in the CT imaging system use-case, the x-ray tube may be integrated into a rotating gantry. As such, in smaller scale frame of reference, the shaft is stationary relative to the sleeve but in a larger scale frame of reference, both components exhibit similar rotational motion in the gantry. However, in alternate use-case scenarios, the x-ray tube may be integrated into a stationary structure in regard to the larger scale frame of reference. It will also be appreciated that the liquid metal bearing assembly described in greater detail herein may be deployed in alternate types of systems utilizing liquid metal bearings, in some instances.

A rotor 218 and a stator 220 are also provided in the x-ray tube 200. The rotor 218 is coupled to the rotational component 208 and is designed to impart rotational motion thereto. The stator 220 is shown positioned external to the low-pressure enclosure 204. However, other suitable stator locations have been envisioned. Typically, the rotor and stator can include windings, magnets, electrical connections, etc., electromagnetically interacting to generate rotor rotation responsive receiving control commands, from, for example, the x-ray controller 110 shown in FIG. 1.

The x-ray tube 200 further includes an anode 210 and a cathode 212. The anode 210 is coupled to the rotational component 208, which may impart rotation of the anode 210 during generation of an x-ray beam. The cathode 212 is part of a cathode assembly and may receive signals from a controller, such as the x-ray controller 110 shown in FIG. 1, to generate an electron beam directed toward a surface of the anode 210. An x-ray beam 214 is generated when the electron beam from the cathode 212 strikes the anode 210. The x-rays are emitted through an x-ray window 216 in the housing 202.

Turning to the liquid metal bearing assembly 205, a plurality of liquid metal bearings may comprise the assembly. In the illustrated embodiment, the liquid metal bearing assembly 205 may include a liquid metal journal bearing 222 and a liquid metal thrust bearing 224, both of which may be supplied liquid metal by a liquid metal reservoir, as described with respect to FIG. 3. However, assembly configurations with additional or alternate bearings may be used, in other embodiments. The liquid metal journal bearing 222 is designed to support radial loads and the liquid metal thrust bearing 224 is designed to support axial loads. In this way, loads on the sleeve (e.g., the rotational component 208) may be managed to enable efficient sleeve rotation.

Each of the bearings of the liquid metal bearing assembly 205 include an interface 226 in which liquid metal acts as a lubricant and also supports radial and axial loads. The thickness of the interface may be selected based on factors such as the type of liquid metal used in the bearing, manufacturing tolerances of the components, expected system operating temperature, and so on. Thus, in one use-case example the thickness of the liquid metal interface may be on the order of 5 microns (μm)-40 μm. The thickness of the liquid metal interface of the liquid metal journal bearing 222 may be in the radial direction of the liquid metal bearing assembly 205 (e.g., with respect to the radial axis 252), and the thickness of the liquid metal interface of the liquid metal thrust bearing 224 may be in the radial direction and an axial direction, parallel to the rotational axis 250, of the liquid metal bearing assembly 205. The liquid metal used as the working fluid in the bearing assembly may include gallium, tin, indium, combinations thereof, and so on. The embodiments of a liquid metal bearing assembly described herein with respect to FIGS. 3-11 may use gallium as the liquid metal lubricant.

FIG. 3 depicts an embodiment of a liquid metal bearing assembly 300. In some examples, the liquid metal bearing assembly 300 may be similar to, or the same as, the liquid metal bearing assembly 205, depicted in FIG. 2. As such, features from the bearing assembly 205 and more generally, the x-ray tube 200 may be included in the liquid metal bearing assembly 300 as well as the other liquid metal bearing assembly embodiments described herein. An axis system 320 is provided in FIG. 3, as well as FIGS. 3-11, for reference. The y-axis may be a vertical axis (e.g., parallel to a direction of gravity during conditions in which the liquid metal bearing assembly 300 is mounted to an x-ray source of an imaging system, such as the x-ray imaging system 100 described above with reference to FIG. 1), the x-axis may be a lateral axis (e.g., horizontal axis), and the z-axis may be a longitudinal axis, in one example. However, the axes may have other orientations, in other examples.

The liquid metal bearing assembly 300 includes a rotating component which may be referred to herein as sleeve 302, and a stationary component which may be referred to herein as shaft 304. The sleeve 302 and shaft 304 may be coupled such that the sleeve 302 is rotatable relative to the shaft 304. Each of the sleeve 302 and the shaft 304 are configured with structures which form a liquid metal flow path when the liquid metal bearing assembly 300 is assembled, as shown in FIG. 3 (e.g., the shaft 304 enclosed in the sleeve 302). The liquid metal flow path may include a fill port 310, a liquid metal reservoir 312 (e.g., a lubricant reservoir), a channel 314, and a gap 316. The fill port 310 may be machined as part of the sleeve 302 or formed together with the sleeve 302 (e.g., molded together) and be positioned radially distant from a bearing centerline. For example, the bearing centerline may be a central axis of rotation 350, which is equivalent to the rotational axis 250 of FIG. 2. The fill port 310 may be positioned a first radial distance 322 from the central axis of rotation 350. In some embodiments, the fill port 310 may be positioned in linear alignment with (e.g., parallel to and positioned along) the central axis of rotation 350. The fill port 310 may be positioned parallel to or perpendicular to the central axis of rotation 350. For example, as shown in FIG. 3, the fill port 310 is perpendicular to the central axis of rotation 350 with an inlet 318 of the fill port 310 on a first side 338 of the liquid metal bearing assembly 300. In other embodiments not shown in FIG. 3, the fill port 310 may be oriented parallel to the central axis of rotation 350 with an inlet 318 of the fill port 310 formed in a surface of a first end 326 of the sleeve 302.

In some embodiments, the liquid metal bearing assembly 300 may be configured with more than one fill port. For example, the liquid metal bearing assembly 300 may include the fill port 310 on a first radial side of the sleeve 302 and further include a second fill port (not shown) directly opposite the fill port 310, with respect to a central axis of rotation 350. In some examples, the second fill port may be positioned at a different axial position and/or different circumferential position, relative to the fill port 310. The fill port 310 may be positioned towards the first end 326, axially opposite a second end 328, of the liquid metal bearing assembly 300. The inlet 318 of the fill port 310 may be formed in a surface of the sleeve 302 extending around the central axis of rotation 350, such that an outlet 330 of the fill port 310 is a closer radial distance to the central axis of rotation 350 than the inlet 318, with the fill port 310 extending towards the central axis of rotation 350 in a direction perpendicular thereto. The fill port 310 may extend a first depth 332 from the inlet 318 to the outlet 330. The first depth 332 may be approximately equal to a thickness 334 of the sleeve 302. The first depth 332 may further be greater than a second radial distance 324 between the shaft 304 and the sleeve 302, and less than a shaft width 336 at a same axial position along the length of the sleeve 302 as the fill port 310. In some embodiments, the fill port 310 may have a wetting or antiwetting coating. Further detail regarding the fill port 310 is described with respect to FIGS. 4 and 5.

The liquid metal reservoir 312 may extend annularly around the shaft 304 and have the second radial distance 324 between the shaft 304 and the sleeve 302. The liquid metal reservoir 312 may be fluidically coupled to the fill port 310 and to the channel 314. The liquid metal reservoir 312 may hold a volume which is greater than a combined fill volume of the channel 314 the gap 316. For example, the combined fill volume may be between 2 g and 20 g, depending on a design of the bearing. Use of the fill port 310 coupled to the liquid metal reservoir 312 may increase a useable volume of the liquid metal reservoir 312 compared to liquid metal reservoirs not coupled to a fill port. For example, conventional liquid metal reservoirs may hold less than 2 g of gallium. Increasing an amount of liquid metal which may be held by the liquid metal reservoir 312 may increase a long term tolerance of the bearing to liquid metal leaks as well as increase desirable bearing performance, for example, maintenance of a continuous bearing surface, as further described herein.

The liquid metal flow path including the liquid metal reservoir 312, the channel 314, and the gap 316 may have an annular configuration between the sleeve 302 and the shaft 304. A sloping diameter (e.g., tapering) of the shaft 304 and the sleeve 302 provides a narrowing in width (e.g., between the shaft 304 and the sleeve 302) of the liquid flow path from the liquid metal reservoir 312 to the gap 316. Described another way, at the channel 314, a diameter of the shaft 304 may increase, relative to a diameter of the shaft 304 at the liquid metal reservoir 312, and a diameter of the interior of the sleeve 302 may decrease, relative to a diameter of the interior of the sleeve 302 at the liquid metal reservoir 312, thus decreasing an overall width of the liquid metal flow path between the shaft 304 and the sleeve 302 in a direction from the first end 326 toward the second end 328 of the shaft.

During assembly of the liquid metal bearing assembly 300, liquid metal (e.g., gallium) may be injected or otherwise inserted into the liquid metal reservoir 312 via the fill port 310. The liquid metal may be funneled by the channel 314 to an intersection of the channel 314 and the gap 316. A width of the gap 316 may be less than a width of a bead of liquid metal, therefore the liquid metal may not flow into the gap 316. The liquid metal bearing assembly 300 may be heated and capillary forces may pull the liquid metal from the channel 314 into the gap 316. The liquid metal may thus coat surfaces of bearings of the liquid metal bearing assembly 300 (e.g., a liquid metal journal bearing and/or a liquid metal thrust bearing) to create bearing surfaces which have a continuous layer of liquid metal extending between the sleeve 302 and the shaft 304. This may provide smooth, uninterrupted rotation of the sleeve 302 relative to the shaft 304, such as during operation of an x-ray tube to generate x-ray beams, as described with respect to FIGS. 1 and 2. The liquid metal bearing assembly 300 may further include seals in a lower region 306 of the liquid metal bearing assembly 300, designed to reduce an amount of liquid metal leaking from the bearings. For example, the seals may be rotating seals, compression seals, and so on. The seals may impede liquid metal flow in an axial direction (e.g., along the central axis of rotation 350) away from an anode, such as the anode 210 shown in FIG. 2.

Turning to FIG. 4, a first configuration 400 is shown of a fill port of a liquid metal bearing assembly. The fill port having the first configuration 400 may be the fill port 310 of the liquid metal bearing assembly 300, via which liquid metal, such as gallium, may be inserted into the liquid metal flow path during assembly of the liquid metal bearing assembly 300. A central axis 418 shown in FIG. 4 is to be understood as being perpendicular to the central axis of rotation 350 of the liquid metal bearing assembly 300 of FIG. 3. In some embodiments, as briefly described with respect to FIG. 3, the fill port may be positioned parallel to the central axis of rotation 350, in which cases the central axis 418 is parallel to the central axis of rotation 350. Liquid metal may flow through the fill port 310 in a direction indicated by a first arrow 444 from the inlet 318 to the outlet 330 (e.g., parallel to the central axis 418). The sleeve 302 is shown with x-hatch marks and the fill port 310 is shown without x-hatch marks, to differentiate therebetween.

The fill port 310 is configured as having an inlet diameter 402 in an upper region 410 (e.g., at the inlet 318) and an outlet diameter 404 in a lower region 420 (e.g., at the outlet 330), where the outlet diameter 404 is smaller than the inlet diameter 402. The upper region 410 of the fill port 310 is configured with upper walls 434 having a first length 412, and the lower region 420 of the fill port 310 is configured with lower walls 436 having a second length 414. In some embodiments, the first length 412 may be greater than the second length 414. In other embodiments, the first length 412 may be less than the second length 414 or the first length 412 and the second length 414 may be equal. The upper region 410 and the lower region 420 of the fill port 310 may be coupled by a smooth, linear transition 430 wherein a diameter of the fill port 310 gradually decreases from the inlet diameter 402 to the outlet diameter 404. A transition between the upper region 410 and the smooth, linear transition 430 may have the inlet diameter 402, and a transition between the smooth, linear transition 430 and the lower region 420 may have the outlet diameter 404. Angled walls 432 of the fill port 310 at the smooth, linear transition 430 may be sloped at approximately 30 degrees from the x-axis, with reference to an axis system 416 for a third length 424. In other examples, the angled walls 432 may be arranged at a different angle relative to the x-axis (e.g., less than 45 degrees). In some embodiments, the first length 412 may be greater than the second length 414, and the second length 414 may be greater than the third length 424. In other embodiments, at least two of the first length 412, the second length 414, and the third length 424 may be equal.

The fill port 310 is fluidically coupled to the liquid metal reservoir 312 (of FIG. 3) at the outlet 330 of the lower region 420 and configured such that the liquid metal reservoir 312 and other elements of the liquid metal bearing assembly 300 are open to an exterior 352 (e.g., to atmosphere) of the liquid metal bearing assembly 300 via the inlet 318 when a pin is not positioned in the fill port 310. The inlet 318 has the inlet diameter 402, the outlet 330 has the outlet diameter 404, and therefore the fill port 310 is configured as having a circular cross-section, as further described with respect to FIGS. 6A-6B. When the pin is positioned in the fill port 310, the fill port 310 and therefore the liquid metal reservoir 312 and other elements of the liquid metal bearing assembly 300 may be sealed from the exterior 352. Further detail regarding the pin and positioning thereof in the fill port 310 is described with respect to FIGS. 6A-11. In this way, the fill port 310 may incorporate a self-alignment feature between the fill port 310 and a pin to allow for press fit assembly of the pin and the fill port 310 without galling on insertion.

Turning to FIG. 5, a second configuration 500 is shown of a fill port of the liquid metal bearing assembly 300, which may be the fill port 310 of FIG. 3. Elements of FIG. 4 which are shown in FIG. 5 are equivalently labeled and are not reintroduced, for brevity. A central axis 518 shown in FIG. 5 is to be understood as being perpendicular to the central axis of rotation 350 of the liquid metal bearing assembly 300 of FIG. 3. Liquid metal may flow through the fill port 310 in a direction indicated by a second arrow 544 from the inlet 318 to the outlet 330 (e.g., parallel to the central axis 518). The sleeve 302 is shown with x-hatch marks and the fill port 310 is shown without x-hatch marks, to differentiate therebetween.

In some embodiments, such as the second configuration 500, the lower region 420 of the fill port 310 may have a stepped diameter 506, where a first portion 502 of the lower region 420 adjacent to the smooth, linear transition 430 has the stepped diameter 506 and a second portion 504 of the lower region 420 has the outlet diameter 404. The stepped diameter 506 may be less than the inlet diameter 402 and greater than the outlet diameter 404. A transition between the upper region 410 and the smooth, linear transition 430 may have the inlet diameter 402, and a transition between the smooth, linear transition 430 and the first portion 502 of the lower region 420 may have the stepped diameter 506. A transition between the first portion 502 and the second portion 504 of the lower region 420 may have the outlet diameter 404. Additionally, a fourth length 512 of the first portion 502 may be greater than a fifth length 514 of the second portion 504 in some embodiments. In other embodiments, the fourth length 512 of the first portion 502 may be less than or equal to the fifth length 514 of the second portion 504. For example, each of the fourth length 512 and the fifth length 514 may be 1.5 mm. The outlet diameter 404 may be 0.3 mm when the stepped diameter 406 is 1 mm, for example.

As briefly described above, the liquid metal flow path of the liquid metal bearing assembly 300 may be sealed from the exterior 352 (e.g., atmosphere) by inserting a pin into the fill port 310. The pin may have a plurality of configurations and may use a plurality of methods to seal the pin into the fill port, described herein with respect to FIGS. 6A-11. For example, the pin may be configured as a ball bearing or a plug and may be sealed into the fill port by brazing, a threaded fastener, welding, an angled interference thread such as a pipe thread, and or press-fitting of the pin. In some embodiments, the pin may have a wetting or antiwetting coating to increase a sealing capability of interference fit with the fill port 310. In this way, the fill port 310 may incorporate a sliding radial interference fit with optional axial compression, such as knife-edge member and/or radial compression knife edge, as is further described with respect to FIGS. 6A-11.

Figure 6A:
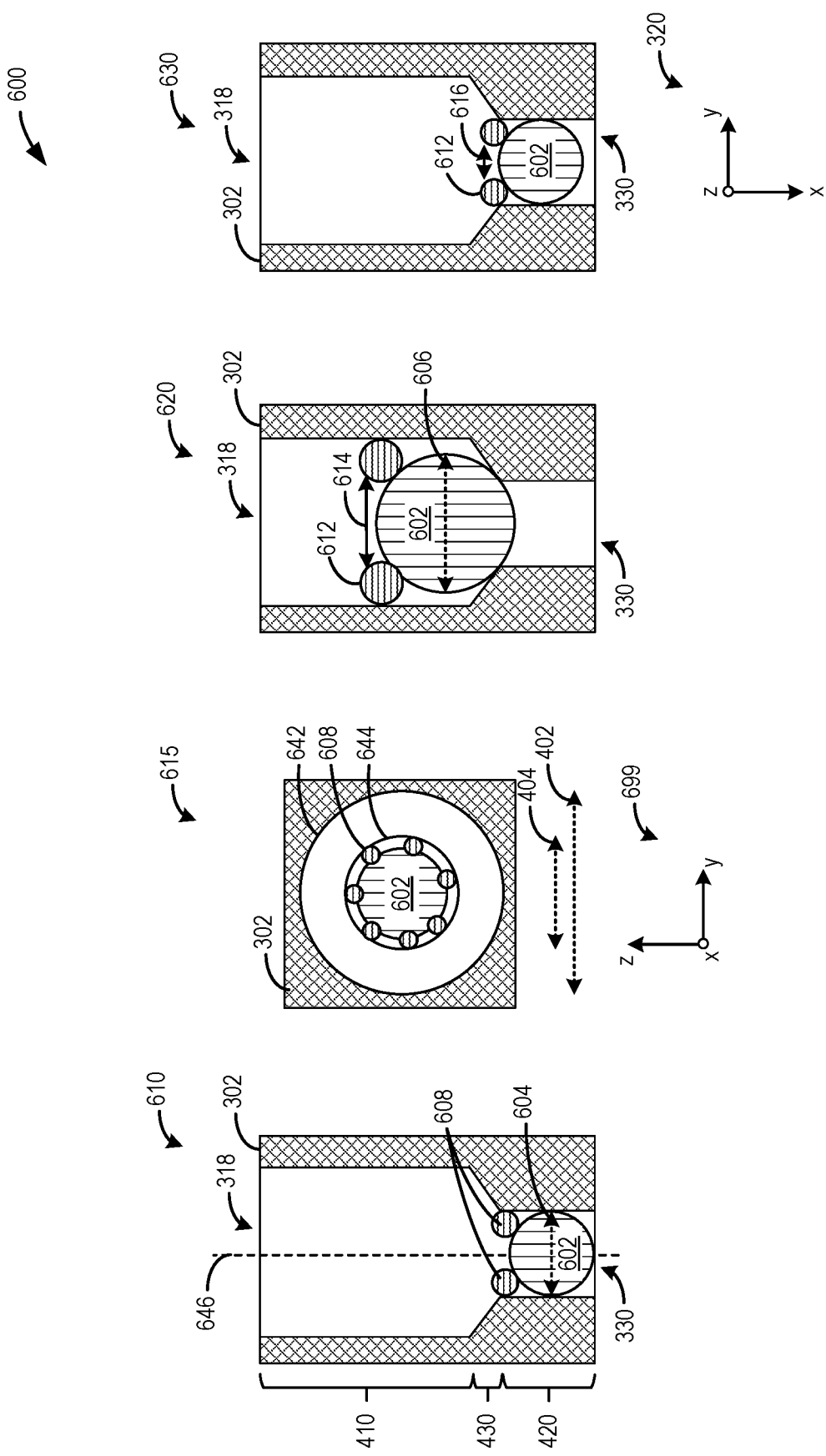
FIGS. 6A-6B show a first plurality of embodiments for a pin, configured as a ball bearing, for a fill port of a liquid metal bearing assembly, according to an embodiment.
Figure 6B:
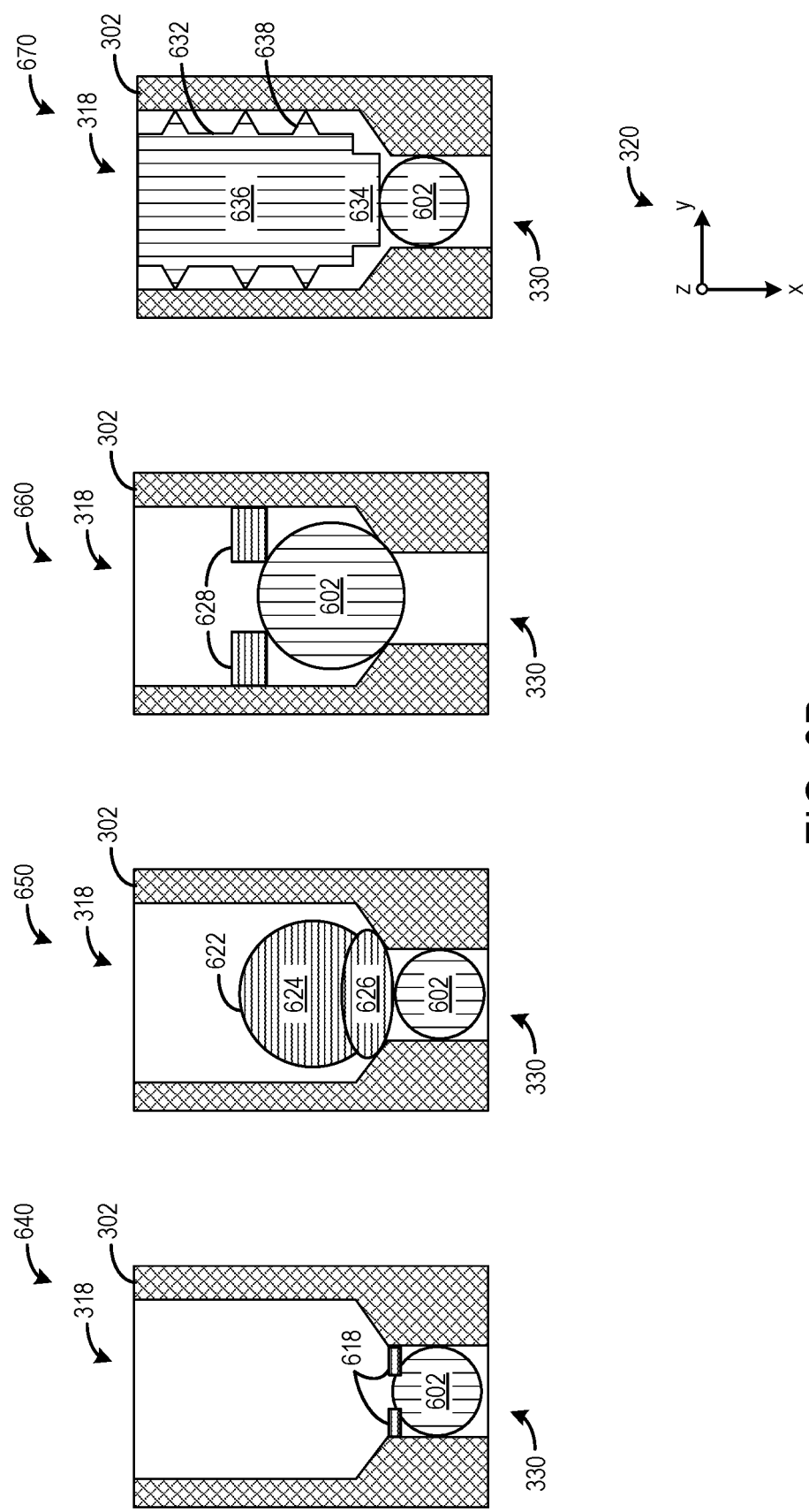

Turning now to FIGS. 6A-6B, a first plurality of embodiments 600 for a pin is shown, where the pin is configured as a ball bearing. Elements of FIGS. 3-5 which are included in FIGS. 6A-6B are equivalently numbered and not reintroduced, for brevity. A central axis 646 shown in FIGS. 6A-6B is to be understood as being perpendicular to the central axis of rotation 350 of the liquid metal bearing assembly 300 of FIG. 3, and it is to be understood that each embodiment of the first plurality of embodiments 600 has the same orientation, with respect to each other. In other embodiments, the central axis 646 may be parallel to the central axis of rotation 350 of the liquid metal bearing assembly 300, where the fill port is positioned a first radial distance from the central axis of rotation 350 or in linear alignment with the central axis of rotation 350. Each embodiment of the first plurality of embodiments 600 shows a cross-sectional view of the pin positioned in a fill port (e.g., the fill port 310 of FIG. 3) having the first configuration 400, where the lower region 420 of the fill port has the outlet diameter 404 for the second length 414. Each embodiment of the pin described with respect to the first plurality of embodiments 600 may be implemented in different configurations of the fill port, such as the second configuration 500 and/or additional configurations, without departing from the scope of the present disclosure. As described with respect to FIGS. 6A-6B, elements having a vertical line fill are to be interpreted as being the pin (e.g., configured as a ball bearing) and elements having a horizontal line fill are to be interpreted as being braze elements. During assembly of the liquid metal bearing assembly (e.g., the liquid metal bearing assembly 300 of FIG. 3), the pin may be inserted into the fill port, followed by insertion of a braze element, and brazing of the braze element to seal the pin in the fill port. Further detail regarding assembly of the liquid metal bearing assembly is described with respect to FIG. 12.

Each of the first plurality of embodiments 600 includes a pin 602 configured as a ball bearing. For example, the pin 602 may be a sphere formed of metal, such as brass, copper, stainless steel, and so on, or formed of ceramics. In some embodiments, the pin 602 may have a wetting or antiwetting coating. In a first embodiment 610, a third embodiment 630, a fourth embodiment 640, a fifth embodiment 650, and a seventh embodiment 670 of the first plurality of embodiments 600, the pin 602 is positioned in the lower region 420 of the fill port. In a second embodiment 620 and a sixth embodiment 660, the pin 602 is positioned such that the pin 602 spans the upper region 410, the smooth, linear transition 430, and the lower region 420. A diameter of the pin 602 may vary among the first plurality of embodiments 600. For example, in the first embodiment 610, the third embodiment 630, the fourth embodiment 640, the fifth embodiment 650, and the seventh embodiment 670, a first pin diameter 604 of the pin 602 may be approximately equal to or less than the outlet diameter 404 of the lower region 420 of the fill port. For example, the first pin diameter 604 may be 0.9 mm when the outlet diameter 404 is 1 mm. As further described with respect to FIG. 12, during assembly of the liquid metal bearing assembly configured with the fill port, the pin 602 may be inserted into the fill port following injection of liquid metal into the liquid metal reservoir. The pin 602 having the first pin diameter 604 may be inserted into the fill port and the first pin diameter 604 may prevent the pin 602 from rolling or otherwise moving into the liquid metal reservoir, for example. In some embodiments, the pin 602 may be coupled to a braze element, as further described herein, prior to insertion of the pin 602 into the fill port, and a configuration of the braze element may prevent the pin 602 from moving into the liquid metal fill port. In the second embodiment 620 and the sixth embodiment 660, a second pin diameter 606 of the pin 602 may be greater than the outlet diameter 404 and less than the inlet diameter 402 of the upper region 410. The second pin diameter 606 of the pin 602 may be such that the pin 602 rests on walls (e.g., the angled walls 432 of FIG. 4) of the smooth, linear transition 430. For example, the second pin diameter 606 may be 3 mm when the outlet diameter 404 is 1 mm and the inlet diameter 402 is 5 mm.

In each of the first embodiment 610, the second embodiment 620, the third embodiment 630, the fourth embodiment 640, the fifth embodiment 650, and the sixth embodiment 660, the pin 602 may be sealed in the fill port using a braze element. In the first embodiment 610, the pin 602 is sealed in place using a plurality of braze beads 608, wherein each braze bead of the plurality of braze beads 608 may be a 0.6 mm diameter sphere, in some embodiments. A top view 615 of the first embodiment 610 shows positioning of the plurality of braze beads 608 around a circumference of the pin 602 with gaps between each of the plurality of braze beads 608. The top view 615 is to be understood as looking into the inlet 318 of the fill port. An axis system 699 shows an orientation of the top view 615, and the axis system 320 shows the orientation of all other embodiments of FIGS. 6A-6B. For the axis system 699, the y-axis may be a vertical axis (e.g., parallel to a direction of gravity during conditions in which the liquid metal bearing assembly 300 is mounted to an x-ray source of an imaging system, such as the x-ray imaging system 100 described above with reference to FIG. 1), the x-axis may be a lateral axis (e.g., horizontal axis), and the z-axis may be a longitudinal axis, in one example. However, the axes may have other orientations, in other examples. As briefly described with respect to FIG. 4, the fill port may have a circular cross-section. The top view 615 of FIGS. 6A-6B shows the circular cross-section of the fill port, wherein an outer-most circle 642 indicates the inlet 318 of the fill port and a second circle 644 indicates an intersection between the smooth, linear transition 430 and the lower region 420. As shown in the first embodiment 610 and the top view 615, the plurality of braze beads 608 are positioned at the intersection between the smooth, linear transition 430 and the lower region 420.

In the second embodiment 620 and the third embodiment 630, the pin 602 is held in place by a wire ring 612. The wire ring 612 may have an annular configuration about the central axis 646 and may rest on the pin 602 such that the pin 602 partially extends through a center of the wire ring 612. A diameter of the wire ring 612 may be dependent on a diameter of the corresponding pin. For example, a first wire ring diameter 614 of the wire ring 612 in the second embodiment 620 may be greater than a second wire ring diameter 616 of the wire ring 612 in the third embodiment 630. The wire ring 612 may be formed of metal, such as brass, copper, stainless steel, and so on, or formed of ceramics, for example. The wire ring 612 may have a circular cross-section, as shown in the second embodiment 620 and the third embodiment 630.

In the fourth embodiment 640, the pin 602 is held in place by a washer 618. The washer 618 may be configured as an annular ring about the central axis 646 and have a rectangular cross-section. The washer 618 may rest on the pin 602 such that the pin 602 partially extends through a center of the washer 618. The washer 618 may be formed of metal, such as brass, copper, stainless steel, and so on, or formed of ceramics, for example.

In the fifth embodiment 650, the pin 602 is held in place by a braze ball 622. The braze ball 622 may be configured as an oval disk 624 which rests on walls of the smooth, linear transition 430 (e.g., the angled walls 432 of FIG. 4), and a sphere 626 coupled to the oval disk 624. For example, the oval disk 624 and the sphere 626 may be a single, continuous element. The braze ball 622 is positioned in the fill port such that the sphere 626 is partially disposed in the upper region 410 of the fill port. The oval disk 624 may be in contact with the pin 602. The braze ball 622 may be formed of metal, such as gold, silver, copper, palladium, platinum, or an alloy of these or similar metals, for example.

The sixth embodiment 660 may have a similar configuration with respect to the second embodiment 620, wherein the pin 602 is positioned such that the pin 602 spans the upper region 410, the smooth, linear transition 430, and the lower region 420, and is held in place by a braze which is formed by melting a braze ring 628. The braze ring 628 may have an annular configuration about the central axis 646 and have a rectangular cross section and a gap in a circumference of the braze ring 628. The braze ring 628 may rest on the pin 602 such that the pin 602 partially extends through a center of the braze ring 628. When the braze ring 628 is melted, melted material of the braze ring 628 flows into a gap between the pin 602 and the sleeve 302 to retain the pin 602. The braze ring 628 may be formed of metal, such as gold, silver, copper, palladium, platinum, or an alloy of these or similar metals, for example.

The seventh embodiment 670 may not include a braze element and instead the pin 602 may be held in place in the fill port using a threaded fastener 632. The threaded fastener 632 may have a stepped cylindrical body, such that a lower extension 634 of the stepped body extends into the smooth, linear transition 430 and an upper extension 636 is positioned in the upper region 410. The upper extension 636 may be further configured with a plurality of threads 638 extending radially from the upper extension 636. The plurality of threads 638 may gall against walls of the upper region 410 (e.g., the upper walls 434 of FIG. 4) in some embodiments. In other embodiments, walls of the upper region 410 may be configured with counterpart threading, such that the threaded fastener 632 may be screwed into the upper region 410 of the fill port after the pin 602 has been inserted into the fill port (e.g., the lower region 420). For example, the plurality of threads 638 and the counterpart threading may be configured to engage directly in face-sharing contact with each other. For example, in some embodiments the threaded fastener 632 may be a tapered interference thread, such as a pipe thread. As described herein, face-sharing contact includes surfaces engaged directly against each other with no other components arranged therebetween. In the embodiments described herein, surfaces in face-sharing contact (e.g., engaged directly against each other) may form a sealed interface such that fluids (e.g., liquid metal) may not flow through an interface between the surfaces. The threaded fastener 632 may be formed of metal, such as brass, copper, stainless steel, and so on, or formed of ceramics, for example. In some embodiments, the threaded fastener 632 may be coupled to the pin 602. In other embodiments, the threaded fastener 632 may be a separate element from (e.g., not coupled to) the pin 602.

Screwing the threaded fastener 632 into the fill port may secure the pin 602 in the fill port and/or create a seal which holds liquid metal within the liquid metal reservoir and isolates the liquid metal reservoir from an exterior of the liquid metal bearing assembly. For embodiments of the first plurality of embodiments 600 including a braze element, the braze element, the pin 602, and the fill port may be brazed to secure the pin 602 in the fill port and isolate the liquid metal reservoir from an exterior of the liquid metal bearing assembly. This may reduce an amount of liquid metal (e.g., gallium) which may leak from the liquid metal bearing assembly during assembly and/or operation thereof. Additionally or alternatively, the braze element may be integrated in the pin 602 by coating an area of the pin with braze material. By inserting liquid metal via the fill port positioned radially from the bearing centerline, degradation of elements of the liquid metal bearing assembly, such as seals, may be reduced compared to conventional methods for assembly of the liquid metal bearing assembly which include pouring liquid metal over bearing elements and/or plunging a shaft of the liquid metal bearing assembly through seals thereof.

Figure 7A:
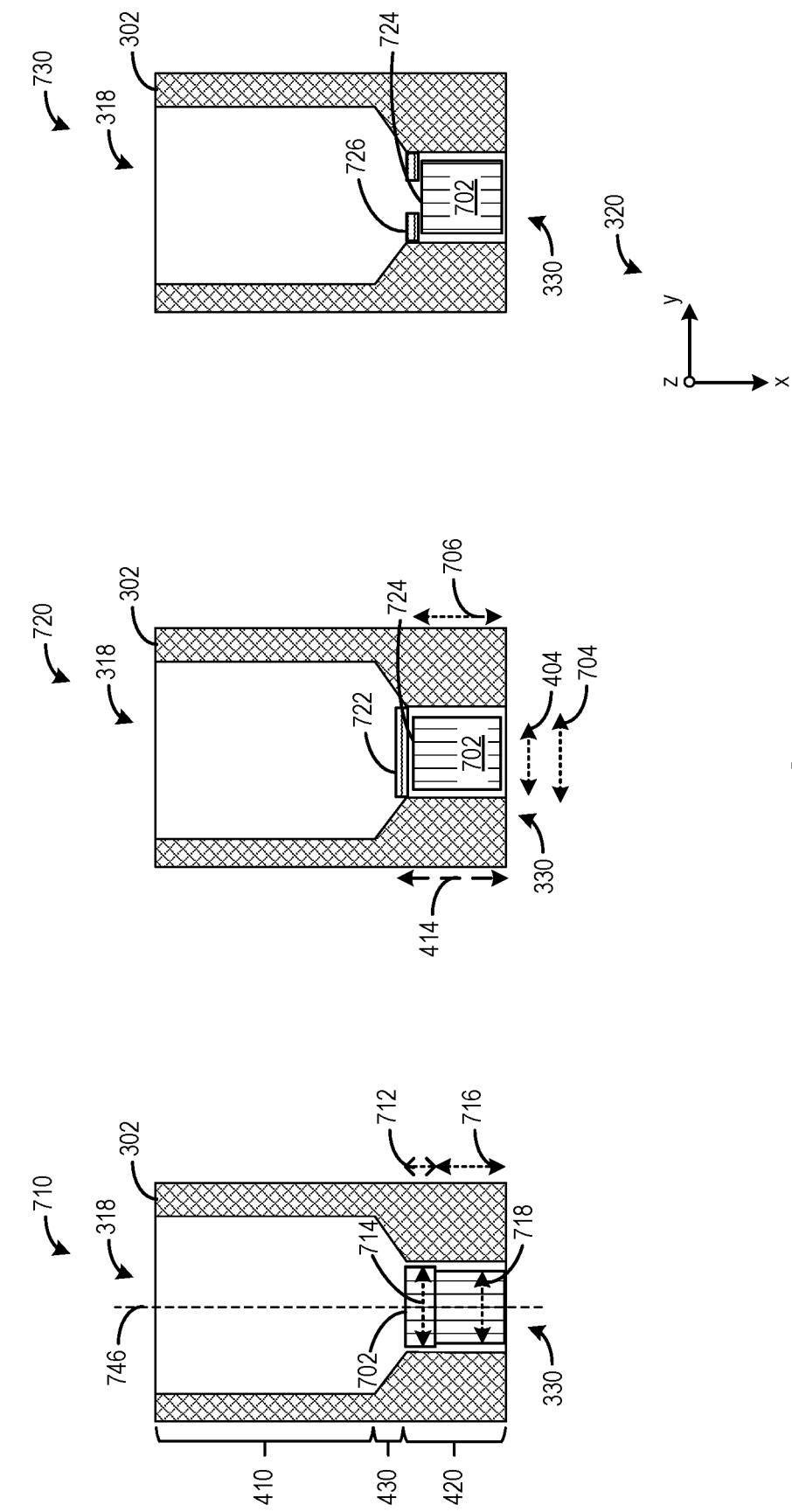
FIGS. 7A-7B show a second plurality of embodiments for a pin, configured as a plug, for a fill port of a liquid metal bearing assembly, according to an embodiment.
Figure 7B:
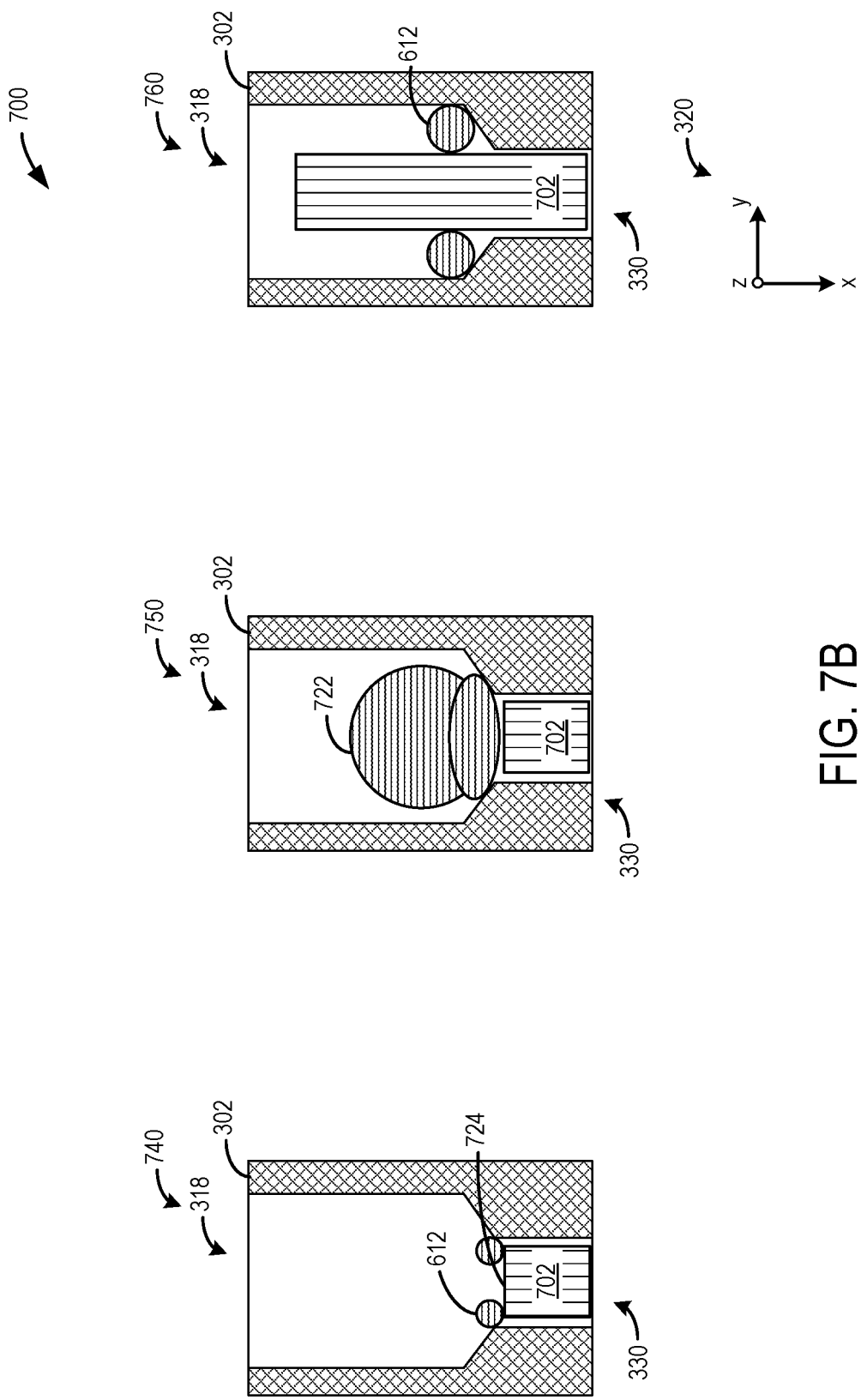

Turning now to FIGS. 7A-7B, a second plurality of embodiments 700 for a pin is shown, where the pin is configured as a plug. Elements of FIGS. 3-5 which are included in FIGS. 7A-7B are equivalently numbered and not reintroduced, for brevity. A central axis 746 shown in FIGS. 7A-7B is to be understood as being perpendicular to the central axis of rotation 350 of the liquid metal bearing assembly 300 of FIG. 3, and it is to be understood that each embodiment of the second plurality of embodiments 700 has the same orientation, with respect to each other. In other embodiments, the central axis 746 may be parallel to the central axis of rotation 350 of the liquid metal bearing assembly 300, where the fill port is positioned a first radial distance from the central axis of rotation 350 or in linear alignment with the central axis of rotation 350. Each embodiment of the second plurality of embodiments 700 shows a cross-sectional view of the pin positioned in a fill port (e.g., the fill port 310 of FIG. 3) having the first configuration 400, where the lower region 420 of the fill port has the outlet diameter 404 for the second length 414. For example, the pin 702 may comprise a self-alignment feature, such as an undercut in pin geometry and/or radial expansion of a body of the pin via a knife-edge member which assists in retention of the pin 702 in the fill port. Each embodiment of the pin described with respect to the second plurality of embodiments 700 may be implemented in different configurations of the fill port, such as the second configuration 500 and/or additional configurations, without departing from the scope of the present disclosure. As described with respect to FIGS. 7A-7B, elements having a vertical line fill are to be interpreted as being the pin (e.g., configured as a plug) and elements having a horizontal line fill are to be interpreted as being braze elements. During assembly of the liquid metal bearing assembly (e.g., the liquid metal bearing assembly 300 of FIG. 3), the pin may be inserted into the fill port, followed by insertion of a braze element, and brazing of the braze element to seal the pin in the fill port. In some embodiments, a braze element may be coupled to the pin prior to insertion of the pin into the fill port, or a braze element may not be used and instead the pin may be press fit into the fill port. Further detail regarding assembly of the liquid metal bearing assembly is described with respect to FIG. 12.

Each of the second plurality of embodiments 700 includes a pin 702 configured as a plug. For example, the pin 702 may have a cylindrical configuration with a first plug width 704 and a first plug height 706. The first plug height may correspond to a type of braze element used to braze the pin 702 in place, as further described herein. In a first embodiment 710, the pin 702 has a stepped configuration where the first plug height 706 is comprised of a second plug height 712 having a second plug width 714 and a third plug height 716 having a third plug width 718. The second plug width 714 is greater than the third plug width 718 and the second plug height 712 is less than the third plug height 716, for example. The pin 702 may be formed of metal, such as brass, copper, stainless steel, and so on, or formed of ceramics, rubber, plastic, or other plastically deformable materials, for example. In each of the second plurality of embodiments 700, the pin 702 is positioned in the lower region 420 of the fill port. In a sixth embodiment 760, the pin 702 has a plug height which extends from the lower region 420, through the smooth, linear transition 430, and into the upper region 410 of the fill port. For example, the first plug width 704 and the second plug width 714 may be 0.8 mm, and the third plug width 718 may be 0.9 mm when the outlet diameter 404 of the lower region 420 is 1 mm. The first plug height 706 may be 2.8 mm, the second plug height 712 may be 0.5 mm and the third plug height 716 may be 2.3 mm when the second length 414 of the lower region 420 is 3 mm, for example.

In the first embodiment 710, the pin 702 may be press fit into place in the fill port using the stepped configuration of the pin 702. The second plug width 714 may be approximately equal to the outlet diameter of the fill port (e.g., the outlet diameter 404 of FIG. 4), such that, when the pin 702 is inserted into the fill port, the pin 702 galls against lower walls of the fill port (e.g., the lower walls 436 of FIG. 4) and is prevented from moving into the liquid metal reservoir (e.g., the liquid metal reservoir 312 of FIG. 3).

In a second embodiment 720, a third embodiment 730, a fourth embodiment 740, a fifth embodiment 750, and the sixth embodiment 760, the pin 702 may be held in place and prevented from moving into the liquid metal reservoir by a braze element. As further described with respect to FIG. 12, during assembly of the liquid metal bearing assembly configured with the fill port, the pin 702 may be inserted into the fill port following injection of liquid metal into the liquid metal flow path. In some embodiments, the pin 702 may be coupled to a braze element, as further described herein, prior to insertion of the pin 702 into the fill port, and a configuration of the braze element may prevent the pin 702 from moving into the liquid metal reservoir. The second embodiment 720 includes a disk 722 with a height and a flat, circular top face and bottom face as the braze element, wherein the disk 722 may rest on angled walls 432 of the smooth, linear transition 430, or the disk 722 may rest on a top face 724 of the pin 702. In the third embodiment 730, a fastener 726, such as the washer 618 or the braze ring 628 described with respect to FIGS. 6A-6B, may be used as the braze element. The fastener 726 of the third embodiment 730 may rest on the top face 724 of the pin 702. Similarly to the fastener 726, the fourth embodiment 740 includes a wire ring, such as the wire ring 612 described with respect to FIGS. 6A-6B, which may have an annular configuration with respect to the central axis 746 and may rest on the top face 724 of the pin 702. The fifth embodiment 750 includes a braze ball, such as the braze ball 622 described with respect to FIGS. 6A-6B, the braze ball 622 may rest on the top face 724 of the pin 702 and/or the oval disk may rest on walls of the smooth, linear transition 430 (e.g., the angled walls 432 of FIG. 4). As briefly described above, in the sixth embodiment 760, the pin 702 may extend from the lower region 420 through the smooth, linear transition 430, and into the upper region 410. The pin 702 may be surrounded by a wire ring, such as the wire ring 612 of the fourth embodiment 740. For example, the wire ring 612 in the sixth embodiment 760 may be positioned between the pin 702 and the upper walls 434 of the upper region 410 at an intersection between the upper region 410 and the smooth, linear transition 430. Each of the braze elements described herein with respect to the second plurality of embodiments 700 may be formed of metal, such as brass, copper, stainless steel, and so on, or formed of ceramics, for example. For embodiments of the second plurality of embodiments 700 including a braze element, the braze element, the pin 702, and the fill port may be brazed to secure the pin 702 in the fill port and isolate the liquid metal reservoir from an exterior of the liquid metal bearing assembly following insertion of liquid metal into the liquid metal reservoir via the fill port.

Figure 8:
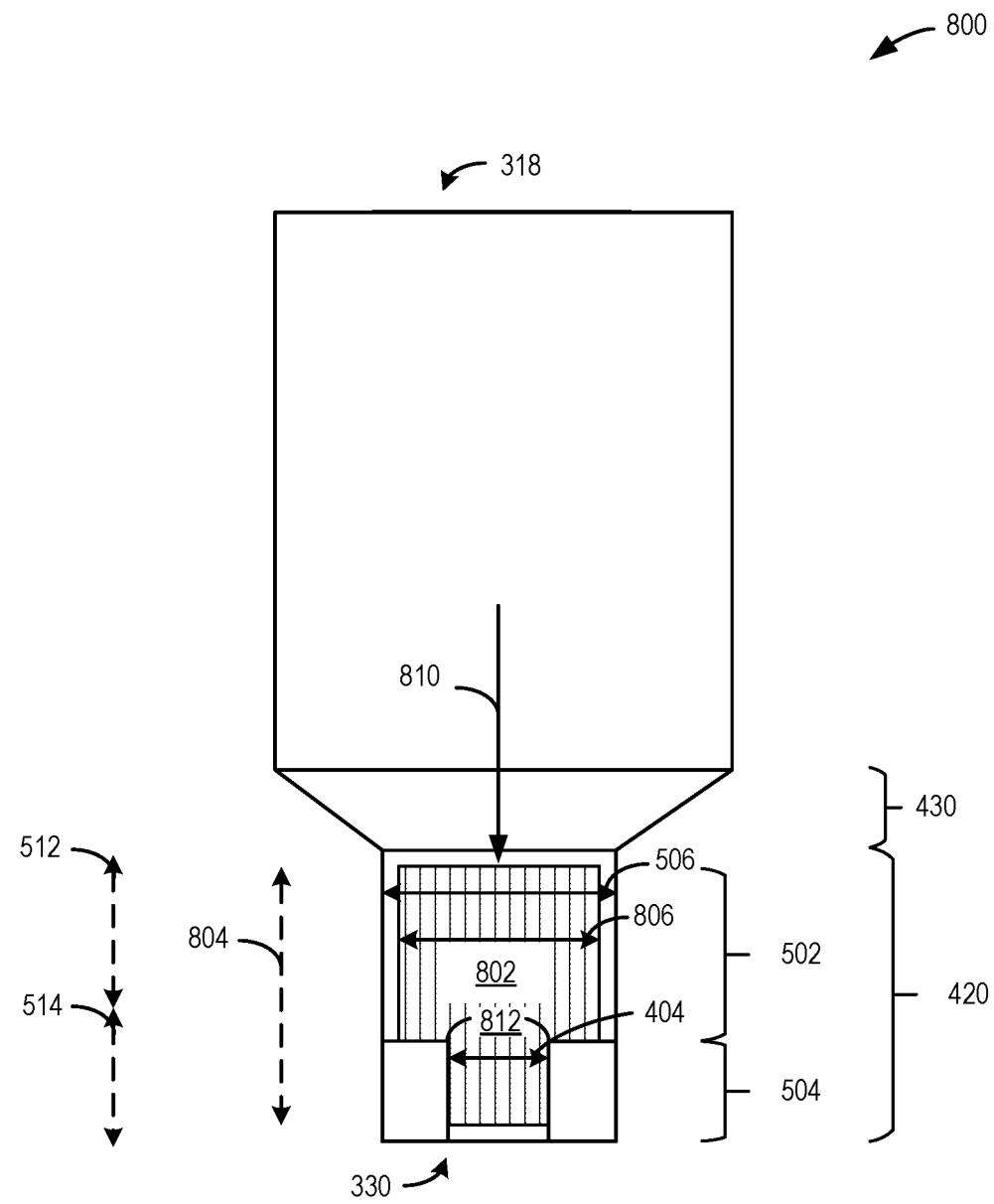
FIG. 8 shows a first embodiment of a pin seated within a fill port of the liquid metal bearing assembly of FIG. 3, according to an embodiment.

FIG. 8 shows a first pin embodiment 800 which may be welded or laser brazed into the second configuration 500 of the fill port. In other terms, the first pin embodiment 800 includes a straight pin fitting into a stepped hole. Elements of FIGS. 4 and 5 which are included in FIG. 8 are equivalently numbered. A pin 802 of the first pin embodiment 800 may be configured as a plug, as described with respect to FIGS. 7A-7B. The pin 802 is shown with a vertical line fill to differentiate from the fill port. The pin 802 may have a first pin height 804 and a first pin diameter 806. As described with respect to FIG. 5, the fill port has the outlet diameter 404 in the second portion 504 of the lower region 420 and the stepped diameter 506 in the first portion 502 of the lower region 420. For example, the stepped configuration includes corners 812 at the intersection between the first portion 502 and the second portion 504 of the lower region 420. For example, the corners 812 may engage directly in face-sharing contact with the pin 802 and be configured as a lip, a step, and so on. A transition between the smooth, linear transition 430 and the lower region 420 may have the stepped diameter 506, and a transition between the first portion 502 and the second portion 504 may have the outlet diameter 404. The first pin diameter 806 may be less than the stepped diameter 506 and greater than the outlet diameter 404. In some embodiments, each of the fourth length 512 and the fifth length 514 may be equal, and the first pin height 804 may be greater than the fourth length 512 and the fifth length 514. The second portion 504 may have the outlet diameter 404, which is less than the first pin diameter 806.

The pin 802 may be formed of a plastically deformable material, such as metal, ceramic, plastic, rubber and so on, which is more deformable than the material of the fill port. In this way, when the pin 802 is inserted into the lower region 420 of the fill port and force is applied in a direction indicated by an arrow 810 to push the pin 802 further into the second portion 504 of the lower region 420 (e.g., to press fit the pin 802), the pin 802 may be plastically deformed to fit into the second portion 504. For example, pin 802 may sheer or gall against walls of the fill port in the lower region 420 (e.g., the lower walls 436) such that the first pin diameter 806 is reduced to be less than the outlet diameter 404. A resultant interference of the pin 802 in the second portion 504 of the lower region may be 50 µm, in some embodiments. The first pin embodiment 800 may thus have a size slip fit, enabling braze flow as well as guiding of the pin 802 into the second portion 504 of the lower region 420 (e.g., an interference region). The pin 802 may additionally be welded or laser brazed into the fill port, following press fitting of the pin 802. In some embodiments, the pin 802 may be directly brazed to the fill port without use of an additional braze element, or a braze element may be included, such as braze elements described with respect to FIGS. 7A-7B.

Figure 9:
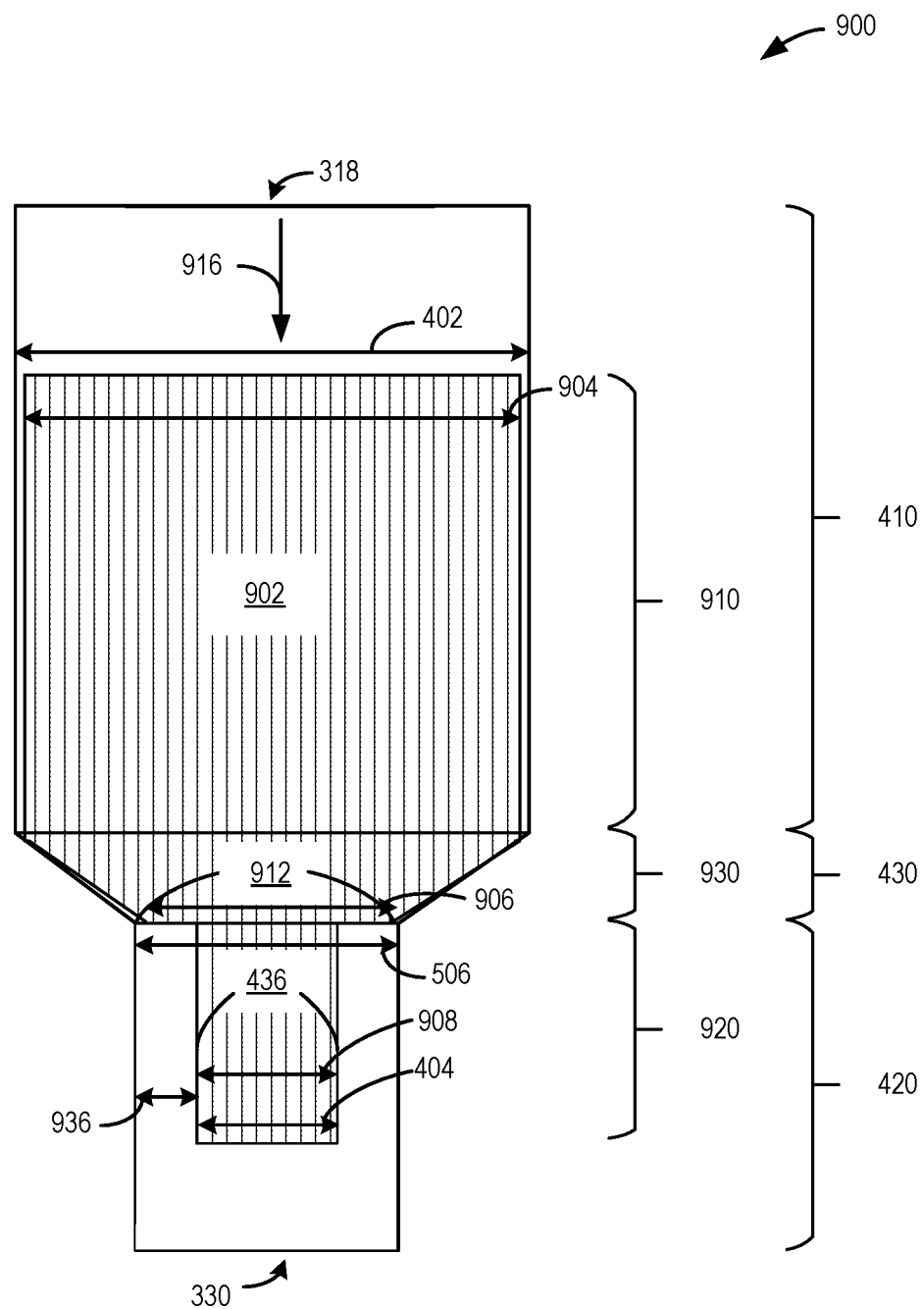
FIG. 9 shows a second embodiment of a pin seated within a fill port of the liquid metal bearing assembly of FIG. 3, according to an embodiment.

Turning to FIG. 9, a second pin embodiment 900 is shown, wherein a pin has a stepped configuration and may be press fit into a fill port having a stepped configuration. Elements of FIGS. 4 and 5 which are included in FIG. 9 are equivalently numbered. A pin 902 of the second pin embodiment 900 may be configured as a plug, as described with respect to FIGS. 7A-7B. The pin 902 is shown with a vertical line fill to differentiate from the fill port. The pin 902 may be configured to have a shape similar to that of an interior of the fill port. For example, the pin 902 may include a tapered surface, which may be positioned in the smooth, linear transition 430 of the fill port 310, where the tapering surface of the pin 902 has the same angle as the tapered surface of the fill port at the smooth, linear transition 430. In other words, the pin 902 may be configured as having counterpart surfaces with respect to the fill port 310. The pin 902 includes an upper pin region 910, a lower pin region 920, and a smooth, linear pin transition 930 therebetween. Each of the upper pin region 910, the smooth, linear pin transition 930, and the lower pin region 920 are coupled to form a continuous body of the pin 902. The lower pin region 920 may have a lower pin diameter. For example, dimensions of the pin 902 are proportionately less than dimensions of the interior of the fill port. For example, the pin 902 has a third pin diameter 904 at the upper pin region 910. A diameter of the pin 902 in the smooth, linear pin transition 930 gradually transitions from the third pin diameter 904 (e.g., adjacent to the upper pin region 910) to a fourth pin diameter 906 (e.g., adjacent to the lower pin region 920). In some embodiments, the pin 902 may have a stepped transition between the smooth, linear pin transition 930 and the lower pin region 920. For example, a diameter of the pin 902 at an intersection between the smooth, linear pin transition 930 and the lower pin region 920 may be the fourth pin diameter 906 at the smooth, linear pin transition 930 and a lower pin diameter 908 at the lower pin region 920. The third pin diameter 904 is less than the inlet diameter 402, and the fourth pin diameter 906 and the lower pin diameter 908 are less than the stepped diameter 506.

Further, the fill port may have a stepped configuration, similar to the second configuration 500. In the embodiment shown in FIG. 9, the stepped configuration includes corners 912 at the intersection between the smooth, linear transition 430 and the lower region 420 which may engage directly in face-sharing contact with the pin 902 and be configured as a lip, a step, and so on. As described with respect to FIGS. 4 and 5, the fill port has the inlet diameter 402 in the upper region 410. A diameter of the fill port may gradually transition from the inlet diameter 402 to the stepped diameter 506 in the smooth, linear transition 430. In the configuration of FIG. 9, a diameter of the fill port at an intersection between the smooth, linear transition 430 and the lower region 420 may be the stepped diameter 506 at the smooth, linear transition 430 and the outlet diameter 404 at the lower region 420. Corners 912 may extend a width 936 of the lower walls 436 of the lower region 420 towards the interior of the fill port and thus reduce a diameter of the fill port at the lower region 420 to the outlet diameter 404.

When the pin 902 is configured as having the fourth pin diameter 906 for the entirety of the lower pin region 920 (e.g., the pin 902 is not stepped), the fourth pin diameter 906 may be plastically deformed and thus reduced when the pin 902 is press fit into the fill port with the stepped configuration described herein. Plastic deformation of the pin 902 may create a flared interface between the pin 902 and the fill port, which may assist in creating a seal between the pin 902 and the fill port to isolate the liquid metal reservoir from the atmosphere and retain the pin 902 within the fill port. In other embodiments, the pin 902 may have the stepped configuration described herein with respect to FIG. 9, where the lower pin diameter 908 may be less than the outlet diameter 404 of the lower region 420. The lower pin region 920 may therefore be positioned in the lower region 420 of the fill port without galling of the pin 902 in the fill port. When inserted into the fill port, the pin 902 may rest on the angled walls 432 of the smooth, linear transition 430.

Configuration of the pin 902 and the fill port having the stepped configuration described herein may allow for self-alignment of the pin 902 and the fill port as the pin 902 is inserted into the fill port. For example, walls (e.g., upper walls 434) of the upper region 410 and of the smooth, linear transition 430 (e.g., angled walls 432) of the fill port may guide the pin 902 into the fill port. Radial interference of the pin 902 with walls of the fill port may assist in scaling the pin 902 in place in the fill port. The pin 902 may further be press fit into the fill port by applying force in a direction indicated by a second arrow 916.

Figure 10:
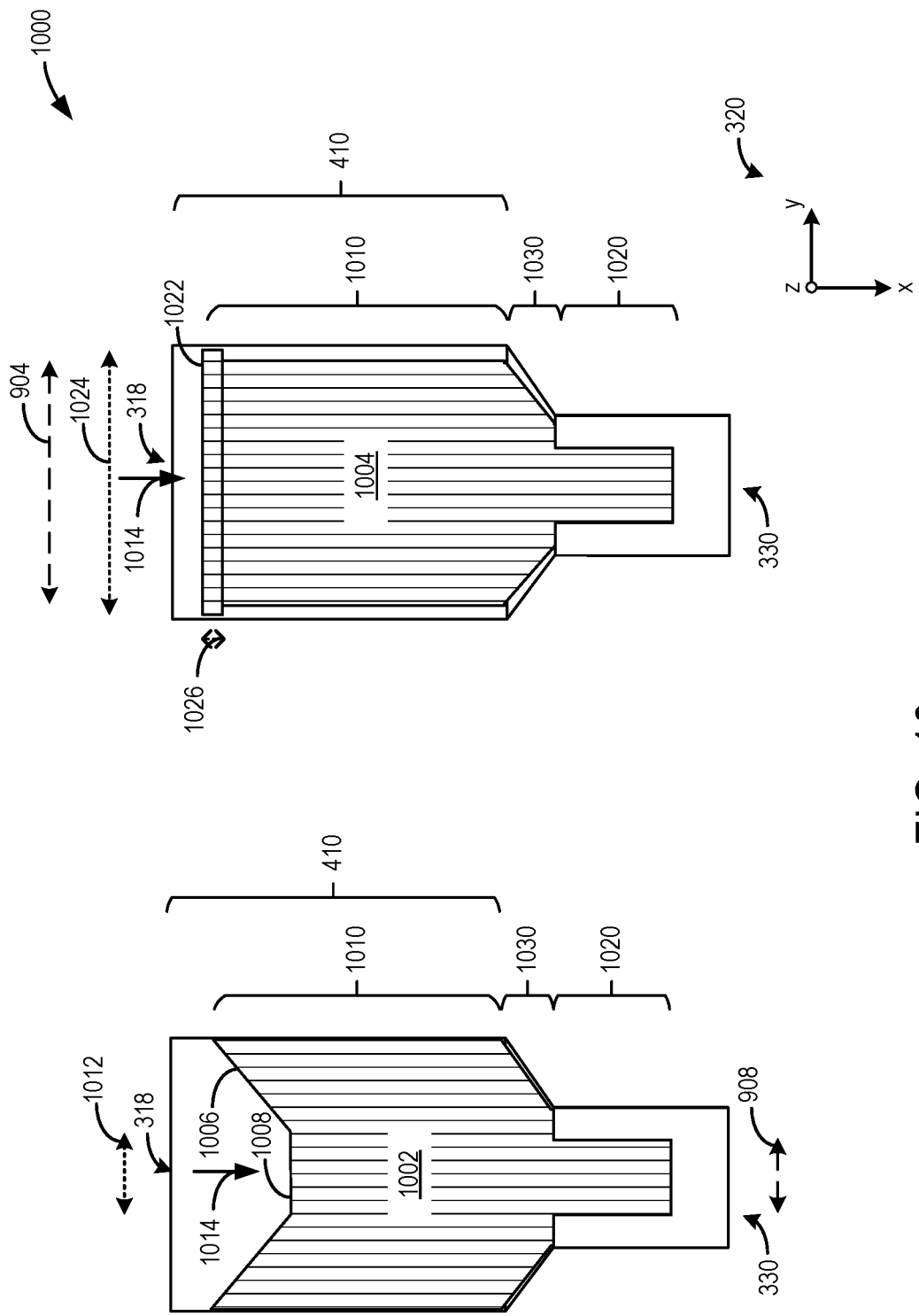
FIG. 10 shows a third plurality of embodiments for a pin seated within a fill port of the liquid metal bearing assembly of FIG. 3, according to an embodiment.

FIG. 10 shows additional configurations 1000 of pins configured as plugs which may be press fit into fill ports having stepped configurations. For example, the fill port may have the second configuration 500 described with respect to FIG. 5, the stepped configuration described with respect to the second pin embodiment 900 of FIG. 9, or another stepped configuration. The additional configurations 1000 are described herein with respect to the stepped fill port configuration of FIG. 9. Elements of FIG. 9 which are included in FIG. 10 are equivalently numbered and may not be reintroduced, for brevity.

Similarly to the pin 902 described with respect to FIG. 9, each of a tapered pin 1002 and a button head pin 1004 may be configured as a plug with a shape similar to that of an interior of the fill port. For example, each of the tapered pin 1002 and the button head pin 1004 includes an upper pin region 1010, a lower pin region 1020, and a smooth, linear pin transition 1030 therebetween. Diameters of each of the upper pin region 1010, the lower pin region 1020, and the smooth, linear pin transition 1030 may be as described with respect to the upper pin region 910, the lower pin region 920, and the smooth, linear pin transition 930 (e.g., relative to diameters of the fill port).

The tapered pin 1002 is further configured with weld preps in the upper pin region 1010. As shown in FIG. 10, weld preps may be visualized as right triangles extending from the upper pin region 1010 towards the inlet 318 of the fill port. FIG. 10 shows a profile view of the fill port and the tapered pin 1002 disposed therein, therefore the weld preps may be a single weld prep 1006 which has an annular configuration with a right triangle profile. The single weld prep 1006 may be coupled to and extend from a top face 1008 of the tapered pin 1002. Right triangles of the single weld prep 1006 may be separated by a distance 1012 (e.g., an interior of the annular configuration), which may be equal to the lower pin diameter 908 of the lower pin region 1020, in some embodiments. In other embodiments, weld preps may include a plurality of weld preps having right triangle-shaped or other shaped profiles which are disposed radially about a circumference of the top face 1008 of the tapered pin 1002, with space between each of the weld preps. Weld preps may be formed of the same material as the tapered pin 1002, such as brass, copper, stainless steel, ceramic, and so on.

The button head pin 1004 is configured with a flat top 1022 in the upper pin region 1010. The flat top 1022 may have a first width 1024 and a first height 1026, wherein the first height 1026 is included in a height of the upper pin region 1010. The first width 1024 of the flat top 1022 may be greater than a width of the button head pin 1004 (e.g., the third pin diameter 904), such that the flat top 1022 extends radially wider than the upper pin region 1010. The flat top 1022 may be formed of the same material as the button head pin 1004, such as brass, copper, stainless steel, and so on, and may be brazed to ceramic.

Each of the tapered pin 1002 and the button head pin 1004 may be press fit into the fill port, such as by inserting the pin into the fill port and applying a force in a direction indicated by a third arrow 1014. Pressing the pin into the fill port (e.g., applying force) may plastically deform each of the tapered pin 1002 and the button head pin 1004, flaring out a top of the pin to create radial contact between the pin and the fill port. For example, when the tapered pin 1002 is press fit into the fill port, the distance 1012 between right triangles of the single weld prep 1006 may increase and the single weld prep 1006 (or plurality of weld preps, in some embodiments) may flare out radially towards upper walls 434 of the upper region 410 of the fill port to create radial contact therebetween. When the button head pin 1004 is press fit into the fill port, the first width 1024 of the flat top 1022 may increase and the first height 1026 of the flat top 1022 may decrease, such that the flat top 1022 flares out radially towards upper walls 434 of the upper region 410 of the fill port to create radial contact therebetween. Radial contact between flared out portions of the tapered pin 1002 and the button head pin 1004 (e.g., the weld prep(s) and the flat top, respectively) may reduce sheer stress during insertion of the respective pin. Additionally, increased interference between the respective pin and the fill port may facilitate welding or brazing of the pin into the fill port to isolate the liquid metal reservoir from the atmosphere. In some embodiments, flaring of the pin may provide contact for welding and/or for addition of a press fit seal (e.g., between the flat top 1022 of the button head pin 1004 and the inlet 318 of the fill port).

Figure 11:
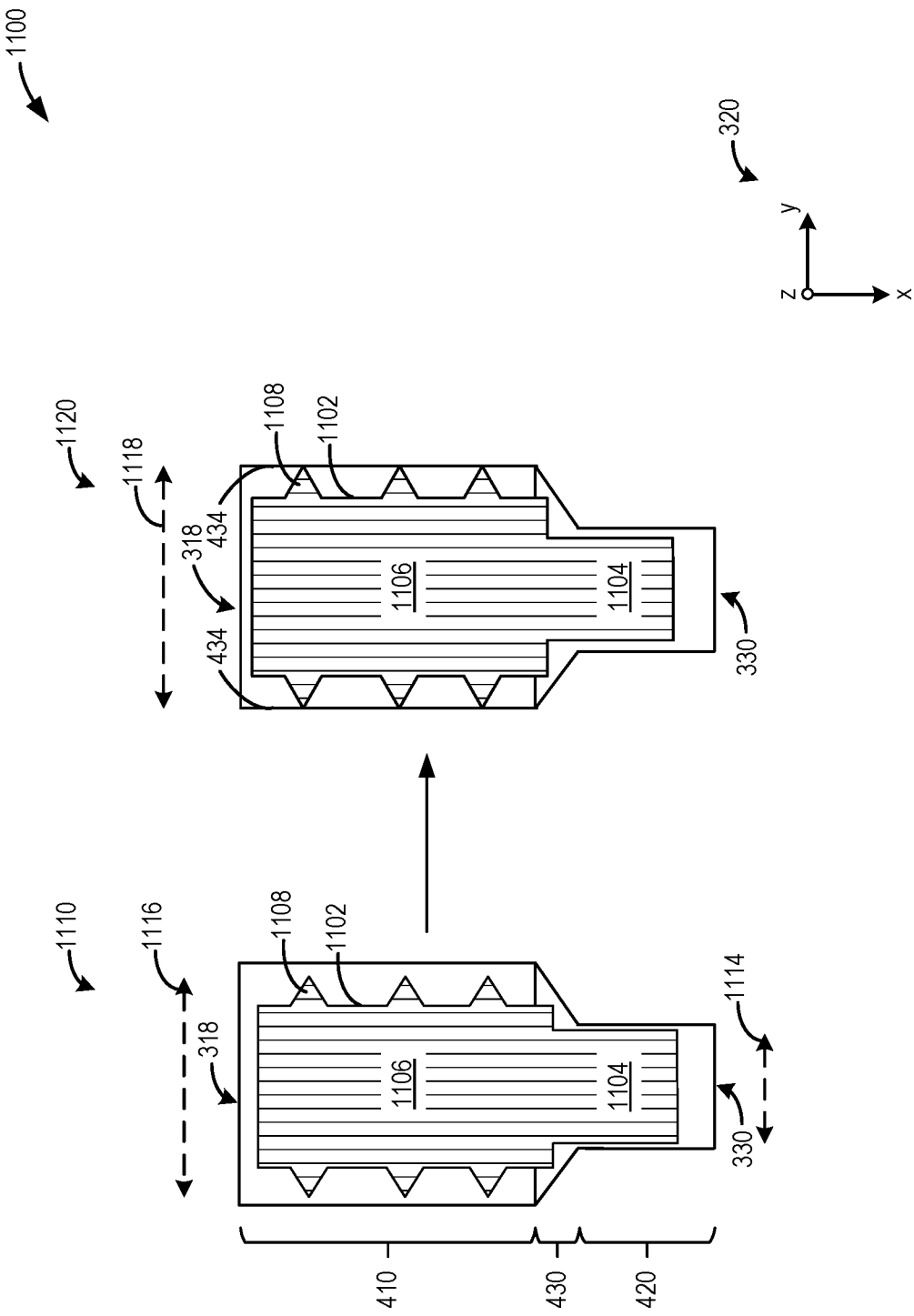
FIG. 11 shows a fourth embodiment of a pin seated within a fill port of the liquid metal bearing assembly of FIG. 3, according to an embodiment.
Figure 12:
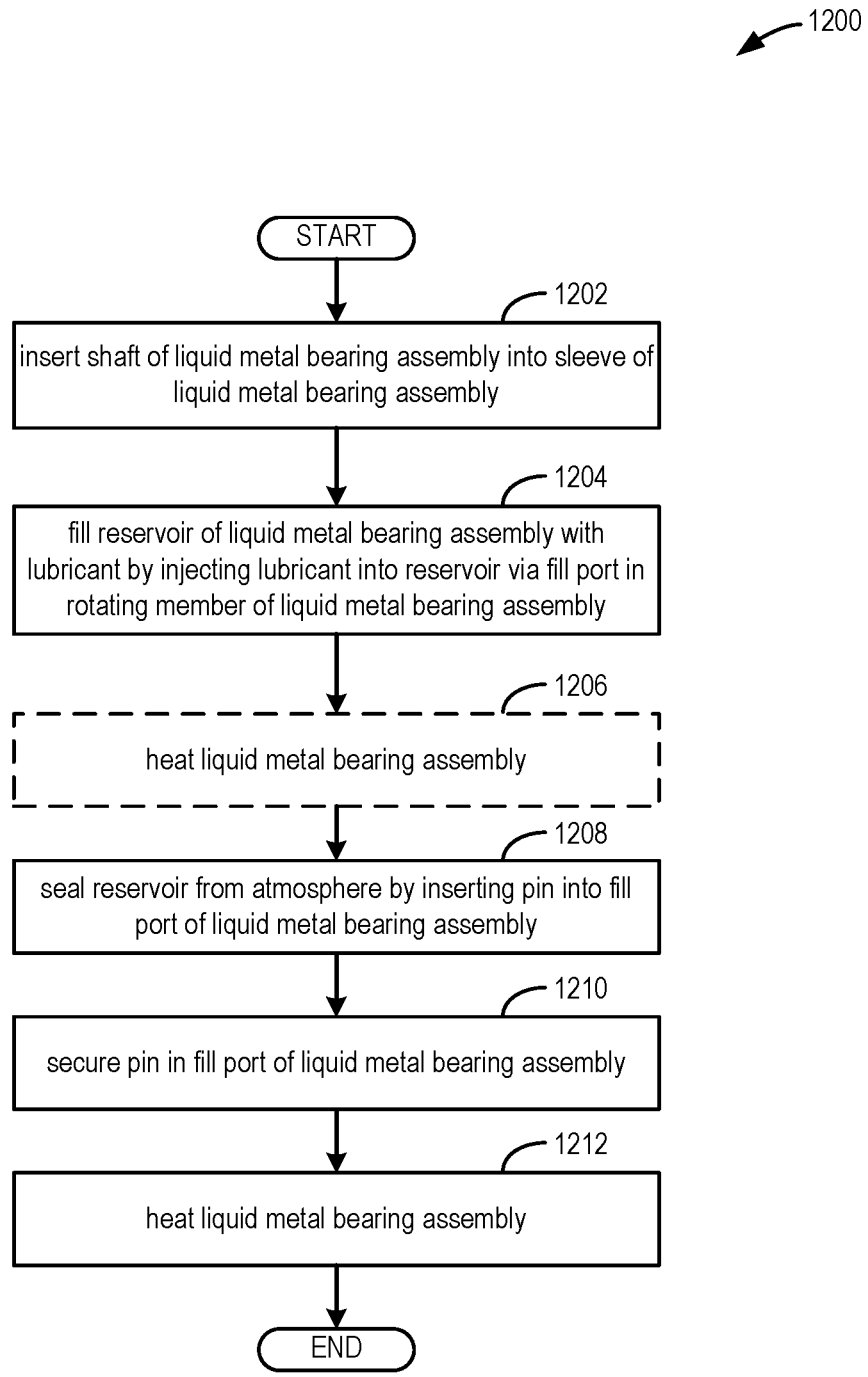
FIG. 12 illustrates a method for assembly of a liquid metal bearing assembly.

FIG. 11 shows an embodiment 1100 of a pin 1102 configured as a threaded fastener plug and/or as a pin having radial interference in addition to a threaded fastener. The pin 1102 may be input into a fill port of a liquid metal bearing assembly, such as a fill port having the first configuration 400 (e.g., not stepped) and/or having the second configuration 500 (e.g., stepped). FIG. 11 is described with respect to a fill port having the first configuration 400, thus elements of FIG. 4 which are included in FIG. 11 are equivalently numbered and not reintroduced for brevity. A configuration of the pin 1102 may radially seal the pin 1102 into the fill port, such that the liquid metal reservoir is isolated from the exterior of the liquid metal bearing assembly. For example, the configuration of the pin 1102 may similar to a configuration of the threaded fastener 632 of FIGS. 6A-6B. The pin 1102 may have a stepped body, such that a lower plug extension 1104 of the stepped body extends through the smooth, linear transition 430 and into the lower region 420, and an upper plug extension 1106 is positioned in the upper region 410. The upper plug extension 1106 is further configured with a plurality of threads 1108 extending radially from the upper plug extension 1106. The plurality of threads 1108 may be circumferential ridges spaced along the upper region 410 with some axial spacing therebetween (e.g., between each thread of the plurality of threads 1108). The lower plug extension 1104 has a first plug diameter 1114 and the upper plug extension 1106 has a first upper extension diameter 1116 in a first embodiment 1110 of the pin 1102.

Following insertion of the pin 1102 into the fill port, a diameter of the upper plug extension 1106 may increase. For example, the first upper extension diameter 1116 may increase to a second upper extension diameter 1118, as shown in a second embodiment 1120, where the second upper extension diameter 1118 is greater than the first upper extension diameter 1116. In some embodiments, the diameter of the upper plug extension 1106 may increase using Poisson's ratio or a third body may be used to deform the upper plug extension 1106 outward (e.g., towards the upper walls 434). As the pin 1102 is compressed axially (e.g., along the x-axis, with respect to the axis system 320), the pin 1102 plastically deforms radially to the second upper extension diameter 1118 such that there is radial interference between the plurality of threads 1108 and the upper walls 434. The plurality of threads 1108 may thus create a seal (e.g., a secondary gallium seal) between the pin 1102 and the fill port without shearing of either element, which assists in retaining the pin 1102 in the fill port. In other embodiments, walls of the upper region 410 may be configured with counterpart threading, such that the pin 1102 may be screwed into the upper region 410 of the fill port following insertion into the fill port (e.g., the lower region 420). For example, the plurality of threads 1108 and the counterpart threading may be configured to engage directly in face-sharing contact with each other. In this way, the pin 1102 may act as a radial seal pin to isolate the liquid metal reservoir from the exterior of the liquid metal bearing assembly. FIG. 12 illustrates a method 1200 for assembling a liquid metal bearing assembly, such as the liquid metal bearing assembly 300 of FIG. 3. As briefly described above, the liquid metal bearing assembly may be implemented in systems such as an x-ray imaging system. When coupled with a rotor and a stator (e.g., the rotor 218 and the stator 220 of FIG. 2), the liquid metal bearing assembly may impart rotational motion to elements coupled to the rotating component (e.g., the sleeve 302 of FIG. 3). A bearing surface, created by a continuous layer of liquid metal extending between the sleeve 302 and the shaft 304, may allow for smooth, uninterrupted rotation of the sleeve 302 relative to the shaft 304. The method for assembling the liquid metal bearing assembly described herein may generate the bearing surface while reducing potential degradation of elements of the liquid metal bearing assembly, such as seals, which may be degraded during other methods of assembly, such as those which include plunging the stationary component (e.g., the shaft 304) through the seals and pouring liquid metal over the stationary component and seals. The method 1200 is herein described with respect to the liquid metal bearing assembly 300, however the method 1200 may be used to assemble other liquid metal bearing assemblies having a fill port disposed in the rotating component radially with respect to a bearing centerline.

At 1202, the method 1200 includes inserting the shaft of the liquid metal bearing assembly into the sleeve of the liquid metal bearing assembly. For example, the sleeve may be formed as a hollow cylinder and the shaft may be inserted from a second end (e.g., the second end 328) of the sleeve and extend through a first end (e.g., the first end 326) of the sleeve. In some embodiments, the shaft may have a flange at an end of the shaft which may prevent the shaft from passing all the way through the sleeve. A sleeve cap may be coupled to the second end of the sleeve to enclose the flange of the shaft and therefore enclose the shaft in the sleeve. Inserting the shaft into the sleeve may form the liquid metal reservoir therebetween. The liquid metal reservoir may be fluidically coupled to an atmosphere (e.g., the exterior 352) of the liquid metal bearing assembly via the fill port when a pin is not positioned in the fill port. In this way, elements of the liquid metal bearing assembly may be assembled prior to introduction of liquid metal into the liquid metal reservoir. This may allow rotating and compression seals to be kept intact during assembly of the liquid metal bearing assembly.

At 1204, the method 1200 includes filling the liquid metal reservoir of the liquid metal bearing assembly with lubricant (e.g., liquid metal) by injecting lubricant into the liquid metal reservoir via the fill port disposed in a rotating member (e.g., the sleeve) of the liquid metal bearing assembly. In some embodiments, such as the embodiments described herein, the lubricant is liquid metal, such as gallium. In other embodiments, the liquid metal may include tin, indium, combinations thereof, and so on. Liquid metal may be dispensed into the liquid metal reservoir by inserting a needle or other dispensing device into the fill port and injecting liquid metal, by pouring liquid metal into the fill port, and so on. Different methods for dispensing lubricant into the liquid metal reservoir may be dependent on the type of lubricant, an orientation of the liquid metal bearing assembly (e.g., an orientation of the bearing centerline with respect to a direction of gravity), and so on. Lubricant (e.g., liquid metal) may fill the liquid metal reservoir and may not flow into a gap between the shaft and the sleeve downstream of the liquid metal reservoir, with respect to the liquid metal flow path (e.g., the gap 316). For example, a bead size of a bead of the liquid metal (e.g., gallium) may be greater than a width of the gap (e.g., a distance between the shaft and the sleeve). Thus, the liquid metal dispensed into the liquid metal reservoir via the fill port may be partially disposed in a channel (e.g., the channel 314) between the liquid metal reservoir and the gap and may not flow into the gap to form the bearing surface.

At 1206, the method 1200 optionally includes heating the liquid metal bearing assembly. Heating the liquid metal bearing assembly may increase reactivity of surfaces of the shaft and the sleeve and increase a capillary force within the interior of the sleeve which pulls gallium into the gap between the shaft and the sleeve.

At 1208, the method 1200 includes sealing the liquid metal reservoir from the atmosphere (e.g., the exterior 352 of the liquid metal bearing assembly) by inserting a pin into the fill port of the liquid metal bearing assembly. The pin may be configured as a ball bearing, as described with respect to FIGS. 6A-6B, or may be configured as a plug, as described with respect to FIGS. 7A-11. The fill port may have a first configuration, such as the first configuration 400 described with respect to FIG. 4 or a second configuration, such as the second configuration 500 described with respect to FIG. 5. Dimensions of the fill port and the pin may be such that inserting the pin into the fill port partially or fully isolates the liquid metal reservoir from the exterior of the liquid metal bearing assembly. In some embodiments, a braze element (e.g., a wire ring, braze beads, a braze ball, a washer, and a braze ring) may be coupled to (e.g., brazed to) the pin prior to insertion of the pin into the fill port. A configuration of the braze element may prevent the pin from moving into the liquid metal reservoir. Additionally or alternatively, a configuration of the pin and the fill port may prevent the pin from moving into the liquid metal reservoir. For example, the fill port may be configured with a self-alignment feature (e.g., the inlet diameter, the smooth, linear transition, and the outlet diameter) which allows positioning of the pin in the fill port without galling therebetween upon insertion of the pin. In some embodiments, the fill port may incorporate a sliding radial interference fit with an optional axial compression (e.g., the stepped diameter and the outlet diameter at the second portion of the lower region of the fill port).

At 1210, the method 1200 includes securing the pin in the fill port of the liquid metal bearing assembly. As described with respect to FIGS. 6A-11, securing the pin may include brazing a braze element to the pin and to the fill port, laser welding the pin in the fill port, screwing a threaded fastener coupled to the pin into the fill port, and/or press fitting the pin to position the pin in the fill port by galling the pin against walls of the fill port and/or plastically deforming the pin.

At 1212, the method 1200 includes heating the liquid metal bearing assembly. Heating the liquid metal bearing assembly may increase reactivity of surfaces of the shaft and the sleeve and increase a capillary force within the interior of the sleeve which pulls gallium into the gap between the shaft and the sleeve. A full volume of liquid metal in the liquid metal reservoir may flow into the gap, thus creating a bearing surface at the gap which may allow uninterrupted rotation of the sleeve relative to the shaft. The method 1200 ends.

In this way, degradation of seals of a liquid metal bearing assembly due to pouring over of liquid metal during assembly may be reduced. Liquid metal may be disposed in a liquid metal bearing assembly (e.g., a liquid metal reservoir) via a radially disposed fill port in a rotating component of the liquid metal bearing assembly. A pin may be positioned in the radially disposed fill port and sealed therein via press fitting, and welding or brazing to isolate the liquid metal reservoir, and therefore an interior of the liquid metal bearing assembly, from an exterior of the liquid metal bearing assembly. Technical effects of the liquid metal bearing assembly configuration described herein may include increased useable bearing life due to a reduction in leak of liquid metal through compression seals of the bearing and/or due to increased liquid metal fill of the liquid metal reservoir. Manufacturing of the liquid metal bearing assembly may be simplified compared to conventional configurations, specifically a number of useable liquid metal bearing assemblies manufactured using the methods described herein may be greater than a number of useable liquid metal bearing assemblies manufactured using methods which include high pressure inserting of a shaft into a sleeve.

FIGS. 2-11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure also provides support for a liquid metal bearing assembly, comprising: a fill port fluidly coupled to a liquid metal reservoir of a liquid metal bearing assembly, the fill port having an inlet diameter and an outlet diameter, the outlet diameter smaller than the inlet diameter, and a pin shaped to fit inside the fill port and prevent liquid metal from leaving the liquid metal reservoir. In a first example of the system, the system further comprises: a rotating component and a stationary component, wherein the rotating component at least partially circumferentially surrounds the stationary component, and the liquid metal reservoir is formed as a second radial distance between the rotating component and the stationary component. In a second example of the system, optionally including the first example, the fill port is disposed in the rotating component a first radial distance from a bearing centerline. In a third example of the system, optionally including one or both of the first and second examples, the outlet diameter of the fill port is positioned between the inlet diameter of the fill port and the liquid metal reservoir of the liquid metal bearing assembly. In a fourth example of the system, optionally including one or more or each of the first through third examples, the inlet diameter and the outlet diameter are coupled by a smooth, linear transition and a diameter of the smooth, linear transition gradually transitions from the inlet diameter to the outlet diameter. In a fifth example of the system, optionally including one or more or each of the first through fourth examples, the pin is configured as a ball bearing. In a sixth example of the system, optionally including one or more or each of the first through fifth examples, the pin is configured as a plug. In a seventh example of the system, optionally including one or more or each of the first through sixth examples, the pin is press fit, brazed, and/or welded into the fill port. In an eighth example of the system, optionally including one or more or each of the first through seventh examples, the liquid metal bearing assembly is a straddle bearing. In a ninth example of the system, optionally including one or more or each of the first through eighth examples, each of the fill port and the pin include a self-alignment feature to allow for press-fit insertion of the pin into the fill port. In a tenth example of the system, optionally including one or more or each of the first through ninth examples, the self-alignment feature of the pin includes an undercut in pin geometry and/or radial expansion of a body of the pin via a knife-edge member.

The disclosure also provides support for a method, comprising: filling a reservoir of a liquid metal bearing with a lubricant by injecting the lubricant into the reservoir via a fill port in a rotating member of the liquid metal bearing, and sealing the reservoir from an atmosphere by inserting a pin into the fill port. In a first example of the method, the method further comprises: welding, brazing, and/or press fitting the pin into the fill port. In a second example of the method, optionally including the first example, the method further comprises: applying a wetting or antiwetting coating to at least one of the fill port or the pin.

The disclosure also provides support for an imaging system, comprising: a cathode, an anode with a rotating feature where the rotating feature is rotated by a liquid metal bearing assembly having a rotating component circumferentially surrounding a stationary component, the rotating component including a fill port positioned a radial distance from a rotational axis of the liquid metal bearing assembly, and where a lubricant reservoir of the liquid metal bearing assembly may be selectively isolated from atmosphere by inserting a pin into the fill port. In a first example of the system, the fill port has an upper region with an inlet diameter, a lower region with an outlet diameter less than the inlet diameter, and a smooth, linear transition coupling the upper region to the lower region, wherein a diameter of the smooth, linear transition gradually transitions from the inlet diameter, adjacent to the upper region to the outlet diameter, adjacent to the lower region. In a second example of the system, optionally including the first example, the lower region is configured with a first portion, having the outlet diameter, and a second portion having a second diameter, less than the outlet diameter, with a stepped transition between the first portion and the second portion. In a third example of the system, optionally including one or both of the first and second examples, the pin is configured as a ball bearing which is press fit and optionally welded or brazed into the fill port using at least one of a wire ring, a washer, a braze ring, a braze ball, and a plurality of braze beads. In a fourth example of the system, optionally including one or more or each of the first through third examples, the pin is configured as a plug which is press fit and optionally welded or brazed into the fill port using at least one of a disk, a washer, a wire ring, a braze ring, and a braze ball. In a fifth example of the system, optionally including one or more or each of the first through fourth examples, the pin has at least one of a stepped configuration with a first plug height having a first plug width and a second plug height having a second plug width, the second plug width less than the first plug width, and a press fit configuration with an upper pin region having an upper pin diameter, a lower pin region having a lower pin diameter, and a smooth, linear pin transition wherein a diameter of the smooth, linear pin transition gradually transitions from the upper pin diameter, adjacent to the upper pin region to the lower pin diameter, adjacent to the lower pin region, and optionally including radial threads in the upper pin region.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A liquid metal bearing assembly, comprising:
   a fill port fluidly coupled to a liquid metal reservoir of a liquid metal bearing assembly, the fill port having an inlet diameter and an outlet diameter, the outlet diameter smaller than the inlet diameter; and
   a pin shaped to fit inside the fill port and prevent liquid metal from leaving the liquid metal reservoir via the fill port.

2. The liquid metal bearing assembly of claim 1, further comprising a rotating component and a stationary component, wherein the rotating component at least partially circumferentially surrounds the stationary component, and the liquid metal reservoir is formed at a second radial distance between the rotating component and the stationary component.

3. The liquid metal bearing assembly of claim 2, wherein the fill port is disposed in the rotating component a first radial distance from a bearing centerline.

4. The liquid metal bearing assembly of claim 3, wherein the fill port is disposed perpendicular to the bearing centerline.

5. The liquid metal bearing assembly of claim 3, wherein the fill port is disposed parallel to the bearing centerline.

6. The liquid metal bearing assembly of claim 1, wherein the fill port further comprises a stepped diameter between the inlet diameter and the outlet diameter, the stepped diameter greater than the outlet diameter and less than the inlet diameter.

7. The liquid metal bearing assembly of claim 1, wherein the pin is configured as at least one of a ball bearing or a plug.

8. The liquid metal bearing assembly of claim 1, wherein the pin is press fit, brazed, and/or welded into the fill port.

9. The liquid metal bearing assembly of claim 1, wherein the liquid metal bearing assembly is a straddle bearing.

10. The liquid metal bearing assembly of claim 1, wherein each of the fill port and the pin include a self-alignment feature to allow for press-fit insertion of the pin into the fill port.

11. The liquid metal bearing assembly of claim 10, wherein the self-alignment feature of the pin includes an undercut in pin geometry and/or radial expansion of a body of the pin via a knife-edge member.

12. A method, comprising:
filling a reservoir of a liquid metal bearing with a lubricant by injecting the lubricant into the reservoir via a fill port in a rotating member of the liquid metal bearing; and
sealing the reservoir from an atmosphere by inserting a pin into the fill port.

13. The method of claim 12, further comprising welding, brazing, and/or press fitting the pin into the fill port to retain the pin within the fill port.

14. The method of claim 12, further comprising applying a wetting or antiwetting coating to at least one of the fill port or the pin.

15. An x-ray source, comprising:
a cathode;
an anode with a rotating feature where the rotating feature is rotated by a liquid metal bearing assembly having a rotating component circumferentially surrounding a stationary component, the rotating component including a fill port positioned a radial distance from a rotational axis of the liquid metal bearing assembly, and where a lubricant reservoir of the liquid metal bearing assembly is selectively isolated from atmosphere by inserting a pin into the fill port.

16. The x-ray source of claim 15, wherein the fill port has an upper region with an inlet diameter, a lower region with an outlet diameter less than the inlet diameter, and a smooth, linear transition coupling the upper region to the lower region, wherein a diameter of the smooth, linear transition gradually transitions from the inlet diameter, adjacent to the upper region to the outlet diameter, adjacent to the lower region.

17. The x-ray source of claim 16, wherein the lower region is configured with a first portion, having a stepped diameter, and a second portion having the outlet diameter, where the outlet diameter is less than the stepped diameter, with a stepped transition between the first portion and the second portion.

18. The x-ray source of claim 15, wherein the pin is configured as a ball bearing which is press fit and optionally welded or brazed into the fill port using at least one of a wire ring, a washer, a braze ring, a braze ball, and a plurality of braze beads.

19. The x-ray source of claim 15, wherein the pin is configured as a plug which is press fit and optionally welded or brazed into the fill port using at least one of a disk, a washer, a wire ring, a braze ring, and a braze ball.

20. The x-ray source of claim 19, wherein the pin has at least one of a stepped configuration with a first plug height having a first plug width and a second plug height having a second plug width, the second plug width less than the first plug width, and a press fit configuration with an upper pin region having an upper pin diameter, a lower pin region having a lower pin diameter, and a smooth, linear pin transition wherein a diameter of the smooth, linear pin transition gradually transitions from the upper pin diameter, adjacent to the upper pin region to the lower pin diameter, adjacent to the lower pin region, and optionally including radial threads in the upper pin region.

\* \* \* \* \*